US011973963B2

(12) United States Patent
Koo et al.

(10) Patent No.: US 11,973,963 B2
(45) Date of Patent: *Apr. 30, 2024

(54) TRANSFORM-BASED IMAGE CODING METHOD AND DEVICE

(71) Applicant: LG ELECTRONICS INC., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,100

(22) Filed: Dec. 27, 2022

(65) Prior Publication Data
US 2023/0133403 A1 May 4, 2023

Related U.S. Application Data

(63) Continuation of application No. 17/562,923, filed on Dec. 27, 2021, now Pat. No. 11,575,914, which is a
(Continued)

(51) Int. Cl.
*H04N 19/18* (2014.01)
*H04N 19/11* (2014.01)
(Continued)

(52) U.S. Cl.
CPC ............ *H04N 19/18* (2014.11); *H04N 19/11* (2014.11); *H04N 19/122* (2014.11);
(Continued)

(58) Field of Classification Search
CPC ...... H04N 19/18; H04N 19/11; H04N 19/122; H04N 19/124; H04N 19/129;
(Continued)

(56) References Cited

U.S. PATENT DOCUMENTS 10,708,164 B2 * 7/2020 Seregin ............... H04N 19/186
10,798,164 B2 * 10/2020 Holmes ............... H04L 65/1069
(Continued)

FOREIGN PATENT DOCUMENTS

CN 102388610 A 3/2012
CN 102986215 A 3/2013
(Continued)

OTHER PUBLICATIONS

J. Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Jul. 13-21, 2017, JVET-G1001-v1, XP030150980.
(Continued)

*Primary Examiner* — Dramos Kalapodas
(74) *Attorney, Agent, or Firm* — Bryan Cave Leighton Paisner LLP

(57) ABSTRACT

An image decoding method according to the present disclosure includes deriving transform coefficients through dequantization based on the quantized transform coefficients for the target block; deriving modified transform coefficients based on an inverse reduced secondary transform (RST) for the transform coefficients; deriving residual samples for the target block based on an inverse primary transform for the modified transform coefficients; and generating a reconstructed samples based on the residual samples, and prediction samples derived based on an intra prediction mode for the target block, wherein the inverse RST is performed based on a transform kernel matrix selected from a transform set including a plurality of transform kernel matrices, the transform set is determined based on a mapping relationship according to the intra prediction mode applied to the target block, and a plurality of intra prediction modes including the
(Continued)

intra prediction mode of the target block are mapped to one transform set.

8 Claims, 17 Drawing Sheets

Related U.S. Application Data continuation of application No. 17/138,662, filed on Dec. 30, 2020, now Pat. No. 11,265,557, which is a continuation of application No. PCT/KR2019/008377, filed on Jul. 8, 2019.

(60) Provisional application No. 62/694,929, filed on Jul. 6, 2018.

(51) Int. Cl.
| | | |
|---|---|---|
| *H04N 19/122* | (2014.01) | |
| *H04N 19/124* | (2014.01) | |
| *H04N 19/129* | (2014.01) | |
| *H04N 19/159* | (2014.01) | |
| *H04N 19/176* | (2014.01) | |
| *H04N 19/184* | (2014.01) | |
| *H04N 19/593* | (2014.01) | |
| *H04N 19/61* | (2014.01) | |
| *H04N 19/91* | (2014.01) | |

(52) U.S. Cl.
CPC ......... *H04N 19/124* (2014.11); *H04N 19/129* (2014.11); *H04N 19/159* (2014.11); *H04N 19/176* (2014.11); *H04N 19/184* (2014.11); *H04N 19/593* (2014.11); *H04N 19/61* (2014.11); *H04N 19/91* (2014.11)

(58) Field of Classification Search
CPC .. H04N 19/159; H04N 19/176; H04N 19/184; H04N 19/593; H04N 19/61; H04N 19/91; H04N 19/12; H04N 19/132
See application file for complete search history.

(56) References Cited

U.S. PATENT DOCUMENTS

| | | | |
|---|---|---|---|
| 2011/0310973 A1 | 12/2011 | Cheon | H04N 19/176 |
| | | | 375/240.18 |
| 2012/0134412 A1 | 5/2012 | Shibahara | H04N 19/124 |
| | | | 375/240.03 |
| 2013/0003828 A1 | 1/2013 | Cohen | H04N 19/12 |
| | | | 375/240.12 |
| 2016/0219290 A1* | 7/2016 | Zhao | H04N 19/136 |
| 2017/0094313 A1 | 3/2017 | Zhao | H04N 19/122 |
| 2017/0094314 A1* | 3/2017 | Zhao | H04N 19/61 |
| 2018/0103252 A1 | 4/2018 | Hsieh | H04N 19/18 |
| 2019/0052876 A1 | 2/2019 | Lee | H04N 19/157 |
| 2019/0141334 A1 | 5/2019 | Lim | H04N 19/117 |
| 2019/0297325 A1 | 9/2019 | Lim | H04N 19/119 |
| 2019/0313095 A1 | 10/2019 | Ikeda | H04N 19/186 |
| 2019/0313102 A1 | 10/2019 | Cho | H04N 19/91 |
| 2020/0053365 A1 | 2/2020 | Aono | H04N 19/18 |
| 2020/0177889 A1* | 6/2020 | Kim | H04N 19/70 |
| 2020/0221075 A1 | 7/2020 | Philippe | H04N 19/14 |
| 2020/0288139 A1 | 9/2020 | Lee | H04N 19/137 |
| 2020/0322633 A1 | 10/2020 | Tsukuba | H04N 19/61 |

FOREIGN PATENT DOCUMENTS

| | | | | |
|---|---|---|---|---|
| CN | 108141596 A | 6/2018 | | |
| EP | 4007277 A1 * | 6/2022 | .......... | H04N 19/119 |
| KR | 10-2012-0046724 A | 5/2012 | | |
| KR | 10-1672456 B1 | 11/2016 | | |
| KR | 10-2017-0107452 A | 9/2017 | | |
| KR | 10-2018-0063186 A | 6/2018 | | |
| WO | 2012118358 A2 | 9/2012 | | |
| WO | 2017058615 A1 | 4/2017 | | |

OTHER PUBLICATIONS

M. Koo et al., "Description of SDR video coding technology proposal by LG Electronics", Joint Video Experts Team (JVET) of ITU-T SG 16 WP 3 and ISO/IEC JTC 1/SC 29/WG 11, Apr. 10-20, 2018, JVET-J0017-v1.

U.S. Appl. No. 17/138,662, filed Dec. 30, 2020.

JVET-F0043_v3: Joint Video Exploration Team (JVET) of ITU-T SG 16 WP 3 and ISO/IEC JTC 1/SC 29/WG 11 6th Meeting: Kim et al., Hobart, AU, Mar. 31-Apr. 7, 2017, "NSST memory reduction," (3 Pages).

Hyeongmun Jeong et al., "Adaptive NSST Kernel Size Selection", JVET-E0047; Geneva, CH, Jan. 2017 (Year: 2017).

Benjamin Huhle; publication "Kernel PCA for Image Compression" Wilhelm-Schickard-Institut, Tubingen, Apr. 2006 (Year: 2006).

* cited by examiner

FIG. 6
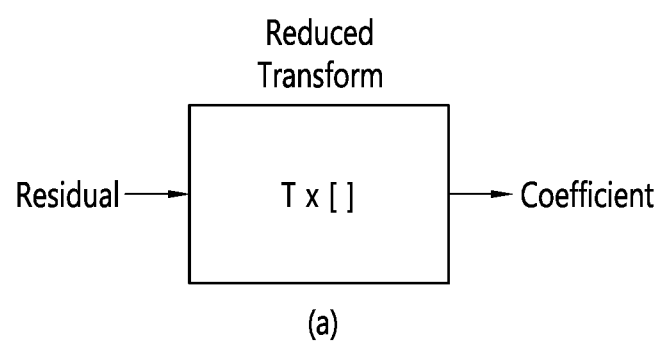
(a)
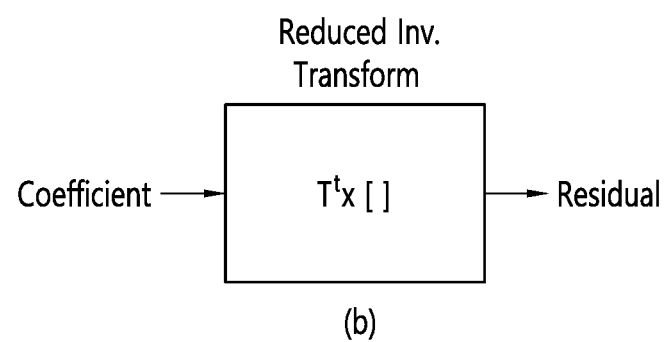
(b)

FIG. 11

| 1 | 3 | 6 | 10 |
|---|---|---|----|
| 2 | 5 | 9 | 15 |
| 4 | 8 | 12 | 15 |
| 7 | 11 | 14 | 16 |

(a)

| 1 | 2 | 3 | 4 |
|---|---|---|---|
| 5 | 6 | 7 | 8 |
| 9 | 10 | 11 | 12 |
| 13 | 14 | 15 | 16 |

(b)

| 1 | 5 | 9 | 13 |
|---|---|---|----|
| 2 | 6 | 10 | 14 |
| 3 | 7 | 11 | 15 |
| 4 | 8 | 12 | 16 |

TRANSFORM-BASED IMAGE CODING METHOD AND DEVICE

CROSS-REFERENCE TO RELATED APPLICATIONS

Pursuant to 35 U.S.C. § 119(e), this application is a Continuation of U.S. application Ser. No. 17/562,923, filed Dec. 27, 2021, which is a Continuation Application of U.S. patent application Ser. No. 17/138,662, filed Dec. 30, 2020, which is a Continuation of International Application PCT/KR2019/008377, with an international filing date of Jul. 8, 2019, which claims the benefit of U.S. Provisional Patent Application No. 62/694,929, filed on Jul. 6, 2018, the contents of which are hereby incorporated by reference herein in its entirety.

TECHNICAL FIELD

The present disclosure relates generally to an image coding technology and, more particularly, to an image coding method based on a transform in an image coding system and an apparatus therefor.

BACKGROUND

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical objective of the present disclosure is to provide a method and apparatus which increase image coding efficiency.

Another technical objective of the present disclosure is to provide a method and apparatus which increase transform efficiency.

Still another technical objective of the present disclosure is to provide a method and apparatus which increase efficiency of residual coding through transform.

Still another technical objective of the present disclosure is to provide an image coding method and apparatus which are based on reduced secondary transform (RST).

Still another technical objective of the present disclosure is to provide an image coding method and apparatus which are based on a transform set and capable of increasing coding efficiency.

According to an example of the present disclosure, there is provided an image decoding method performed by a decoding apparatus. The method includes deriving quantized transform coefficients for a target block from a bitstream; deriving transform coefficients through dequantization based on the quantized transform coefficients for the target block; deriving modified transform coefficients based on an inverse reduced secondary transform (RST) for the transform coefficients; deriving residual samples for the target block based on an inverse primary transform for the modified transform coefficients; and generating a reconstructed block based on the residual samples for the target block, and prediction samples derived based on an intra prediction mode for the target block, wherein the inverse RST is performed based on a transform kernel matrix selected from a transform set including a plurality of transform kernel matrices, the transform set is determined based on a mapping relationship according to the intra prediction mode applied to the target block, and a plurality of intra prediction modes including the intra prediction mode of the target block are mapped to one transform set.

According to another example of the present disclosure, there is provided a decoding apparatus which performs image decoding. The decoding apparatus includes an entropy decoder deriving information on prediction and quantized transform coefficients for a target block from a bitstream; a predictor generating a prediction sample for the target block based on an intra prediction mode included in the information on prediction; dequantizer deriving transform coefficients through dequantization based on quantized transform coefficients for the target block; an inverse transformer including an inverse reduced secondary transformer that derives modified transform coefficients based on inverse RST of the transform coefficients, and an inverse primary transformer that derives residual samples for the target block based on first inverse transform of the modified transform coefficients; and an adder that generates a reconstructed picture based on the residual samples and the prediction samples, wherein the inverse reduced secondary transformer performs inverse RST based on a transform kernel matrix included in a transform set having a mapping relationship with the intra prediction mode, the transform set is determined based on a mapping relationship according to the intra prediction mode applied to the target block, and a plurality of intra prediction modes including the intra prediction mode of the target block are mapped to one transform set.

According to an example of the present disclosure, there is provided an image encoding method performed by an encoding apparatus. The method includes deriving prediction samples based on an intra prediction mode applied to a target block; deriving residual samples for the target block based on the prediction sample; deriving transform coefficients for the target block based on a primary transform for the residual sample; deriving modified transform coefficients based on a reduced secondary transform (RST) for the transform coefficient; and deriving quantized transform coefficients by performing quantization based on the modified transform coefficients, wherein the RST is performed based on a transform kernel matrix selected from a transform set including a plurality of transform kernel matrices, the transform set is determined based on a mapping relationship according to the intra prediction mode applied to the target block, and a plurality of intra prediction modes including the intra prediction mode of the target block are mapped to one transform set.

According to still another example of the present disclosure, a digital storage medium in which image data including encoded image information generated according to the image encoding method performed by an encoding apparatus is stored may be provided.

According to still another example of the present disclosure, a digital storage medium in which image data including encoded image information causing the decoding apparatus to perform the image decoding method is stored may be provided.

According to the present disclosure, it is possible to increase overall image/video compression efficiency.

According to the present disclosure, through efficient transform it is possible to reduce amount of data that must be transferred for a residual process, and to increase the residual coding efficiency.

According to the present disclosure, it is possible to concentrate non-zero transform coefficients in a low frequency component through secondary transform in the frequency domain.

According to the present disclosure, it is possible to increase the image coding efficiency by preforming the image coding based on the transform set.

BRIEF DESCRIPTION OF THE DRAWINGS

FIG. 6 is a diagram for explaining an RST according to an example of the present disclosure.

FIG. 11 is a diagram representing a scan order applied to a 4×4 transform coefficient.

FIG. 12 is diagrams illustrating the mapping of a transform coefficient according to a diagonal scan order in accordance with an example of the present disclosure.

DESCRIPTION OF EXEMPLARY EMBODIMENTS

Figure 1:
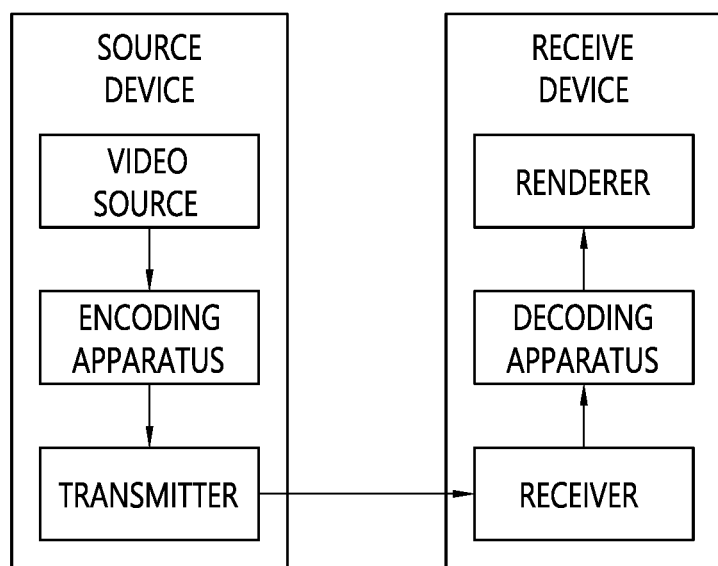
FIG. 1 schematically represents an example of a video/image coding system to which the present disclosure may be applied.

While the present document may be susceptible to various modifications and include various embodiments, specific embodiments thereof have been shown in the drawings by way of example and will now be described in detail. However, this is not intended to limit the present document to the specific embodiments disclosed herein. The terminology used herein is for the purpose of describing specific embodiments only, and is not intended to limit technical idea of the present document. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present document as long as they do not depart from the essence of the present document.

Hereinafter, preferred embodiments of the present document will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 schematically represents an example of a video/image coding system to which the present document may be applied.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
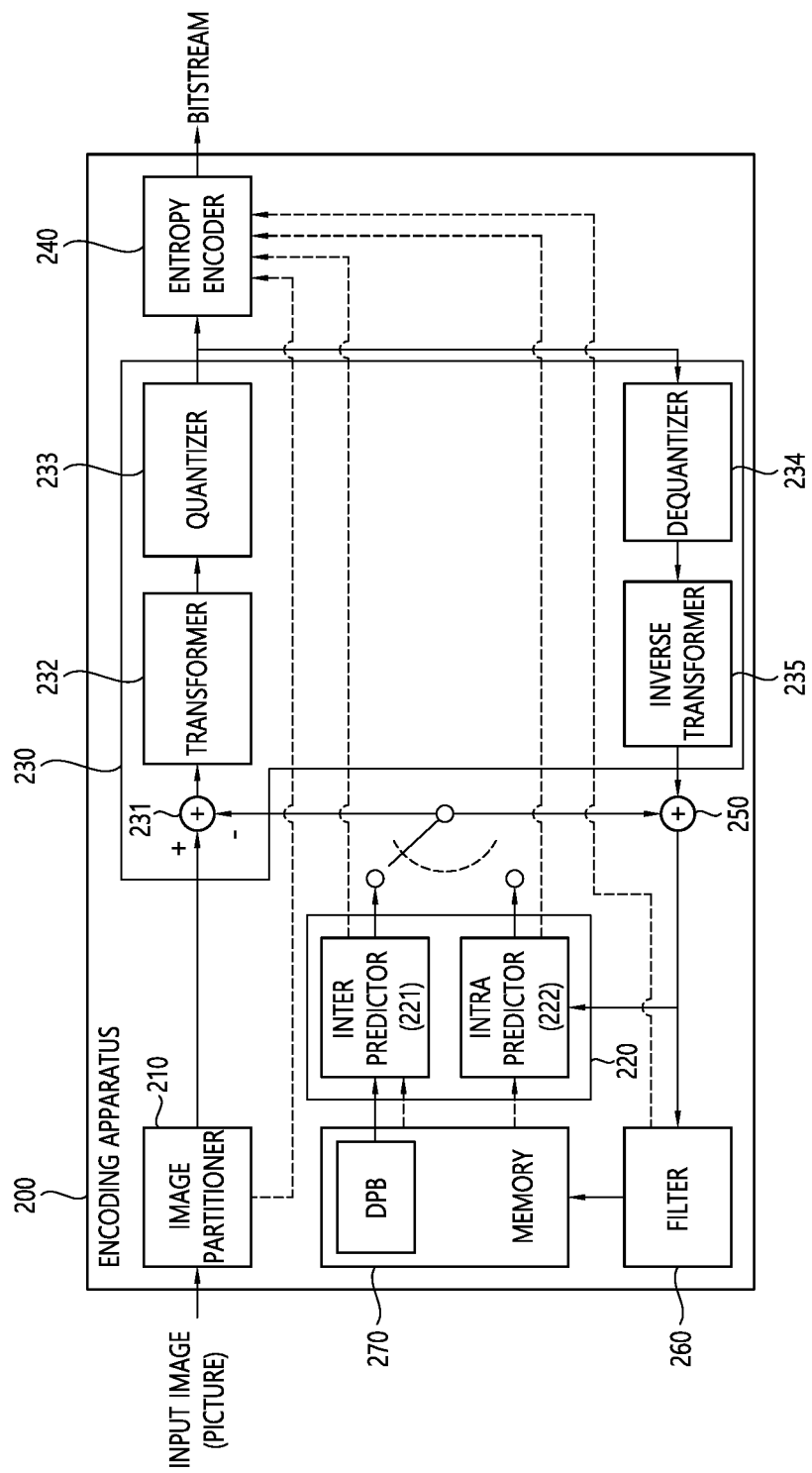
FIG. 2 is a diagram schematically describing a configuration of a video/image encoding apparatus to which the present disclosure may be applied.

FIG. 2 is a diagram schematically describing a configuration of a video/image encoding apparatus to which the present document may be applied. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present document may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the inter predictor 221 or the intra predictor 222 from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present document.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present document, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
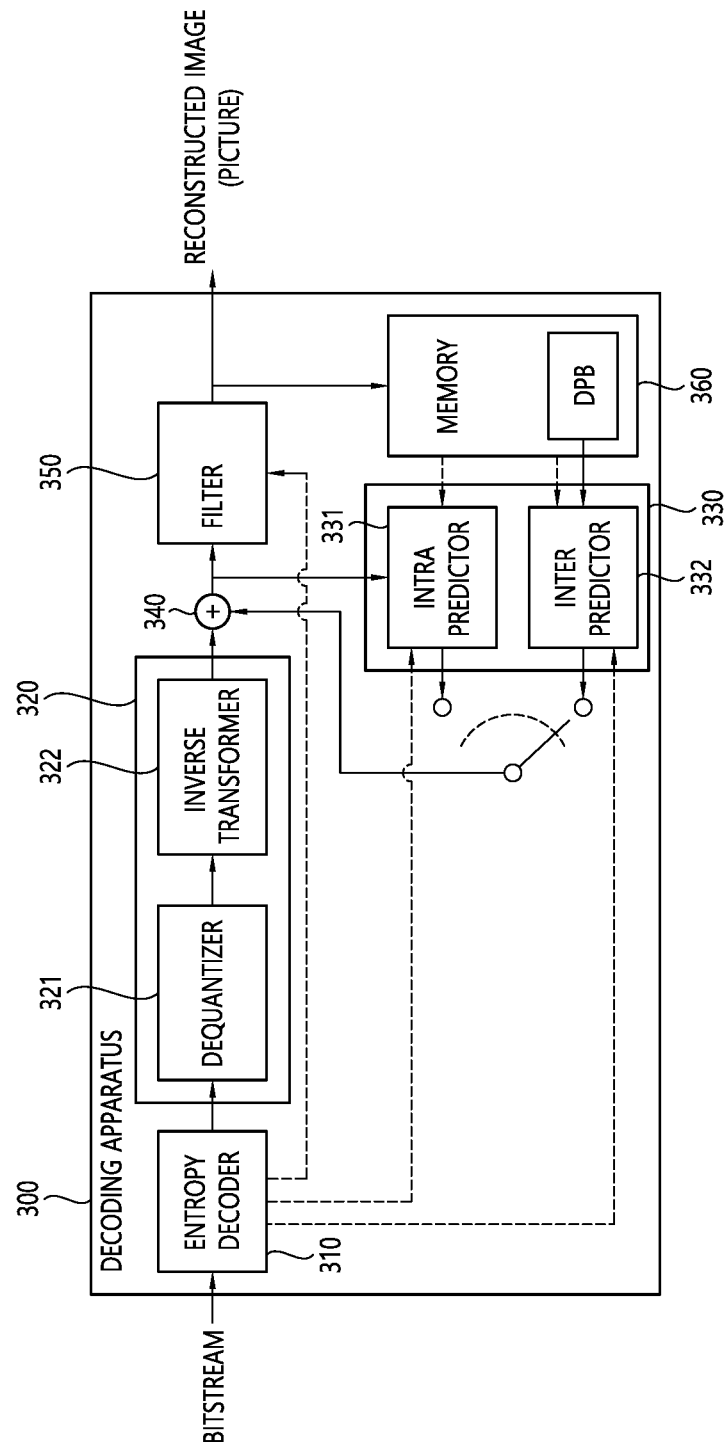
FIG. 3 is a diagram schematically describing a configuration of a video/image decoding apparatus to which the present disclosure may be applied.

FIG. 3 is a diagram schematically describing a configuration of a video/image decoding apparatus to which the present document may be applied.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present document, signaled/ received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present document may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present document.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
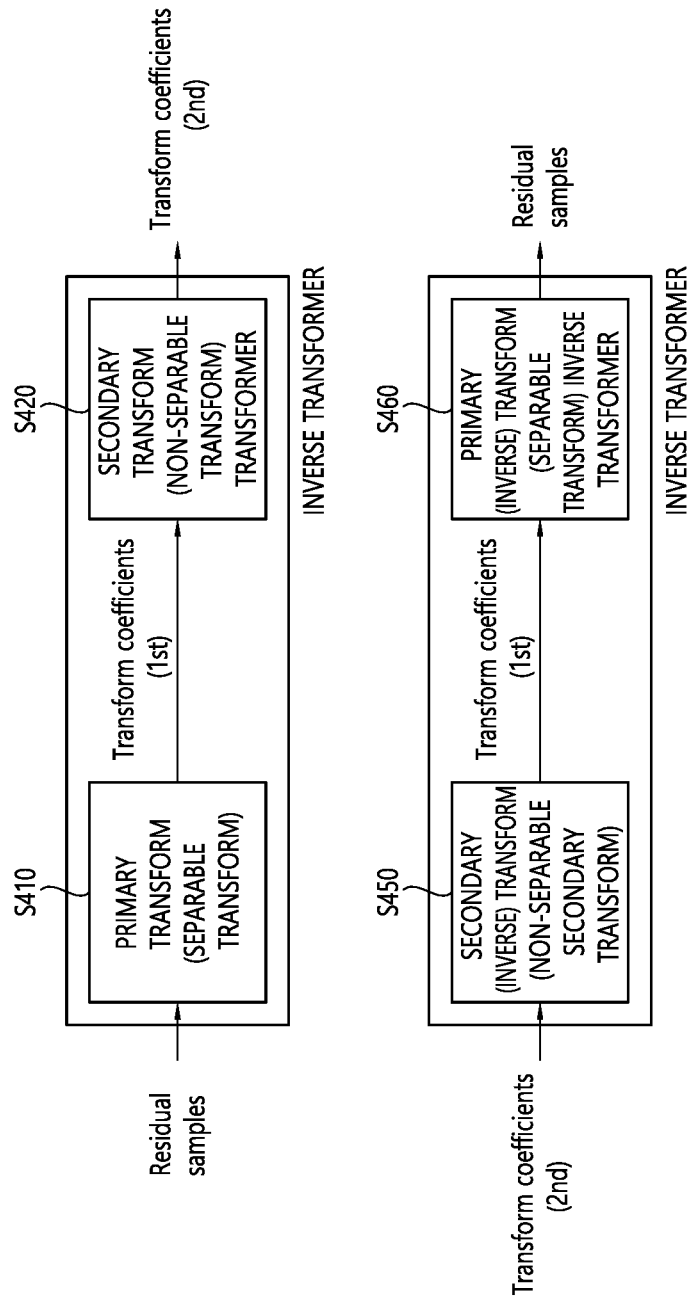
FIG. 4 schematically represents a multiple transform technique according to an example of the present disclosure.

FIG. 4 schematically represents a multiple transform technique according to the present disclosure.

Referring to FIG. 4, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S410). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core.

For reference, the DCT/DST transform types may be defined based on basis functions, and the basis functions may be represented as in the following table.

TABLE 1

| Transform Type | Basis function $T_i(j)$, i, j = 0, 1, ..., N − 1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br><br> where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, <br><br> where $\omega_0 = \begin{cases} \sqrt{\frac{2}{N}} & i = 0 \\ 1 & i \neq 0 \end{cases}, \omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |

TABLE 1-continued

| Transform Type | Basis function $T_i(j)$, i, j = 0, 1, ..., N − 1 |
|---|---|
| DST-VII | $T_i(j) = \sqrt{\dfrac{4}{2N+1}} \cdot \sin\left(\dfrac{\pi \cdot (2i+1) \cdot (j+1)}{2N+1}\right)$ |

If the multiple core transform is performed, then a vertical transform kernel and a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

The transformer may derive modified (secondary) transform coefficients by performing the secondary transform based on the (primary) transform coefficients (S420). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which the vertical and horizontal components of the (primary) transform coefficients are not separated, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8, W)×min(8, H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8, W)×min(8, H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \qquad \text{[Equation 1]}$$

If the X is represented in the form of a vector, the vector $\vec{X}$ may be represented as below.

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T \qquad \text{[Equation 2]}$$

In this case, the secondary non-separable transform may be calculated as below.

$$\vec{F} = T \cdot \vec{X} \qquad \text{[Equation 3]}$$

where $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. At this time, in order to select the mode dependent transform kernel, sets of 3 non-separable secondary transform kernels for the non-separable secondary transform may be configured for the both of the 8×8 transform and the 4×4 transform. That is, 35 transform sets may be configured for the 8×8 transform, and 35 transform sets may be configured for the 4×4 transform. In this case, each of 35 transform sets for the 8×8 transform may include three 8×8 transform kernels, and in this case, each of 35 transform sets for the 4×4 transform may include three 4×4 transform kernels. However, the size of the transform, the number of the sets, and the number of the transform kernels in the set are examples, and any other size than 8×8 or 4×4 may be used, or n sets may be configured, and each set may include k kernels.

The transform set may be called an NSST set, and the transform kernel in the NSST set may be called an NSST kernel. The selection of a specific set from among the transform sets may be performed, for example, based on the intra prediction mode of the target block (CU or sub-block).

For reference, as an example, the intra prediction mode may include two non-directional (or non-angular) intra prediction modes and 65 directional (or angular) intra prediction modes. The non-directional intra prediction modes may include a No. 0 planar intra prediction mode, and a No. 1 DC intra prediction mode, and the directional intra prediction modes may include 65 intra prediction modes between a No. 2 intra prediction mode and a No. 66 intra prediction mode. However, this is an example, and the present disclosure may be applied to a case where there are different number of intra prediction modes. Meanwhile, according to circumstances, a No. 67 intra prediction mode may be further used, and the No. 67 intra prediction mode may represent a linear model (LM) mode.

Figure 5:
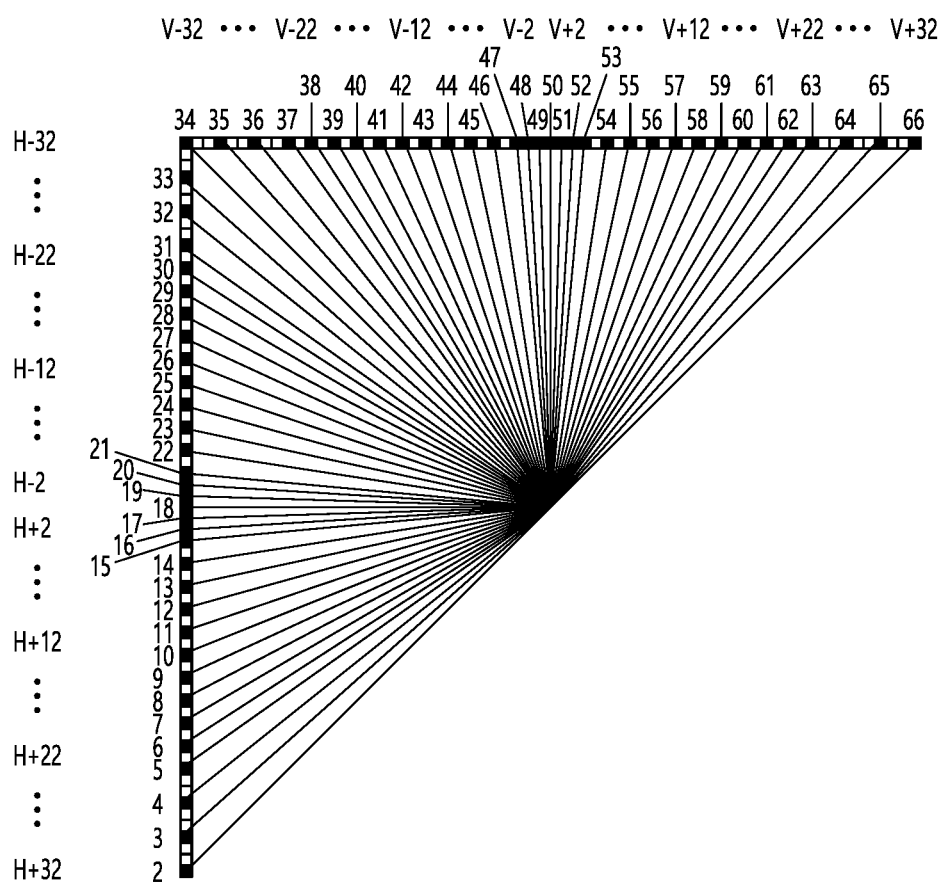
FIG. 5 illustratively represents intra directional modes of 65 prediction directions.

FIG. 5 illustratively represents intra directional modes of 65 prediction directions.

Referring to FIG. 5, on the basis of the No. 34 intra prediction mode having a left upward diagonal prediction direction, the intra prediction mode having a horizontal directionality and the intra prediction mode having vertical directionality may be classified. H and V of FIG. 5 mean horizontal directionality and vertical directionality, respectively, and numerals −32 to 32 indicate displacements in 1/32 units on the sample grid position. This may represent an offset for the mode index value. The Nos. 2 to 33 intra prediction modes have the horizontal directionality, and the Nos. 34 to 66 intra prediction modes have the vertical directionality. Meanwhile, strictly speaking, the No. 34 intra prediction mode may be considered as being neither horizontal nor vertical, but it may be classified as belonging to the horizontal directionality in terms of determining the transform set of the secondary transform. This is because the input data is transposed to be used for the vertical direction mode symmetrical on the basis of the No. 34 intra prediction mode, and the input data alignment method for the horizontal mode is used for the No. 34 intra prediction mode. The No. 18 intra prediction mode and the No. 50 intra prediction mode may represent a horizontal intra prediction mode and a vertical intra prediction mode, respectively, and the No. 2 intra prediction mode may be called a right upward diagonal intra prediction mode because it has a left reference pixel and predicts in a right upward direction. In the same manner, the No. 34 intra prediction mode may be called a right downward diagonal intra prediction mode, and the No. 66 intra prediction mode may be called a left downward diagonal intra prediction mode.

In this case, mapping between the 35 transform sets and the intra prediction modes may be, for example, represented as in the following table. For reference, if an LM mode is applied to a target block, the secondary transform may not be applied to the target block.

TABLE 2

| | | | | | | | | intra mode | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| set | 0 | 1 | 2 | 3 | 4 | 5 | 6 | 7 | 8 | 9 | 10 | 11 | 12 | 13 | 14 | 15 | 16 |
| | | | | | | | | intra mode | | | | | | | | | |
| | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| | | | | | | | | intra mode | | | | | | | | | |
| | 34 | 35 | 36 | 37 | 38 | 39 | 40 | 41 | 42 | 43 | 44 | 45 | 46 | 47 | 48 | 49 | 50 | 51 |
| set | 34 | 33 | 32 | 31 | 30 | 29 | 28 | 27 | 26 | 25 | 24 | 23 | 22 | 21 | 20 | 19 | 18 | 17 |
| | | | | | | | | intra mode | | | | | | | | | |
| | 52 | 53 | 54 | 55 | 56 | 57 | 58 | 59 | 60 | 61 | 62 | 63 | 64 | 65 | 66 | 67 (LM) |
| set | 16 | 15 | 14 | 13 | 12 | 11 | 10 | 9 | 8 | 7 | 6 | 5 | 4 | 3 | 2 | NULL |

Meanwhile, if a specific set is determined to be used, one of k transform kernels in the specific set may be selected through the non-separable secondary transform index. The encoding apparatus may derive a non-separable secondary transform index indicating a specific transform kernel based on the rate-distortion (RD) check, and may signal the non-separable secondary transform index to the decoding apparatus. The decoding apparatus may select one from among k transform kernels in the specific set based on the non-separable secondary transform index. For example, the NSST index value 0 may indicate a first non-separable secondary transform kernel, the NSST index value 1 may indicate a second non-separable secondary transform kernel, and the NSST index value 2 may indicate a third non-separable secondary transform kernel. Alternatively, the NSST index value 0 may indicate that the first non-separable secondary transform is not applied to a target block, and the NSST index values 1 to 3 may indicate the three transform kernels.

Referring back to FIG. 4, the transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S450), and may obtain a residual block (residual samples) by performing a primary (inverse) transform on the (primary) transform coefficients. In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST).

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual.

FIG. 6 is a diagram for explaining an RST according to an example of the present disclosure.

In the present specification, the term "target block" may mean a current block or a residual block on which coding is performed.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 4 below.

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \quad \text{[Equation 4]}$$

The matrix T in the Reduced Transform block shown in FIG. 6A may mean the matrix TR×N of Equation 4. As shown in FIG. 6A, when the reduced transform matrix TR×N is multiplied to residual samples for the target block, transform coefficients for the target block may be derived.

In an example, if the size of the block to which the transform is applied is 8×8 and R=16 (i.e., R/N=16/64=1/4), then the RST according to FIG. 6A may be expressed as a matrix operation as shown in Equation 5 below. In this case, memory and multiplication calculation can be reduced to approximately 1/4 by the reduced factor.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ \vdots \\ r_{64} \end{bmatrix} \quad \text{[Equation 5]}$$

In Equation 5, r1 to r64 may represent residual samples for the target block. As a result of the calculation of Equation 5, transform coefficients $c_i$ for the target block may be derived, and a process of deriving $c_i$ may be as in Equation 6.

for i from 1 to R:

$c_i=0$ for j from 1 to N:

$c_i \mathrel{+}= t_{i,j} \cdot r_j$ [Equation 6]

As a result of the calculation of Equation 6, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N \times R}$ according to an example is N×R less than the size N×N of the regular inverse transform matrix, and is in a transpose relationship with the reduced transform matrix $T_{R \times N}$ shown in Equation 4.

The matrix Tt in the Reduced Inv. Transform block shown in FIG. 6B may mean the inverse RST matrix $T_{N \times R}^T$ (the superscript T means transpose). When the inverse RST matrix $T_{N \times R}^T$ is multiplied to the transform coefficients for the target block as shown in FIG. 6B, the modified transform coefficients for the target block or the residual samples for the target block may be derived.

More specifically, when the inverse RST is applied as the secondary inverse transform, the modified transform coefficients for the target block may be derived when the inverse RST matrix $T_{N \times R}^T$ is multiplied to the transform coefficients for the target block. Meanwhile, the inverse RST may be applied as the inverse primary transform, and in this case, the residual samples for the target block may be derived when the inverse RST matrix $T_{N \times R}^T$ is multiplied to the transform coefficients for the target block.

In an example, if the size of the block to which the inverse transform is applied is 8×8 and R=16 (i.e., R/N=16/64=¼), then the RST according to FIG. 6B may be expressed as a matrix operation as shown in Equation 7 below.

$$\begin{bmatrix} t_{1,1} & t_{2,1} & \cdots & t_{16,1} \\ t_{1,2} & t_{2,2} & \cdots & t_{16,1} \\ t_{1,2} & t_{2,3} & & t_{16,1} \\ \vdots & \vdots & & \vdots \\ & & \ddots & \vdots \\ t_{1,64} & t_{2,64} & \cdots & t_{16,64} \end{bmatrix} \times \begin{bmatrix} c_1 \\ c_{11} \\ \vdots \\ c_{16} \end{bmatrix}$$ [Equation 7]

In Equation 7, $c_1$ to $c_{16}$ may represent the transform coefficients for the target block. As a result of the calculation of Equation 7, $r_j$ representing the modified transform coefficients for the target block or the residual samples for the target block may be derived, and the process of deriving $r_j$ may be as in Equation 8.

for i from 1 to N:

$r_j=0$ for j from 1 to R:

$r_j \mathrel{+}= t_{j,i} \cdot c_i$ [Equation 8]

As a result of the calculation of Equation 8, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

Figure 7:
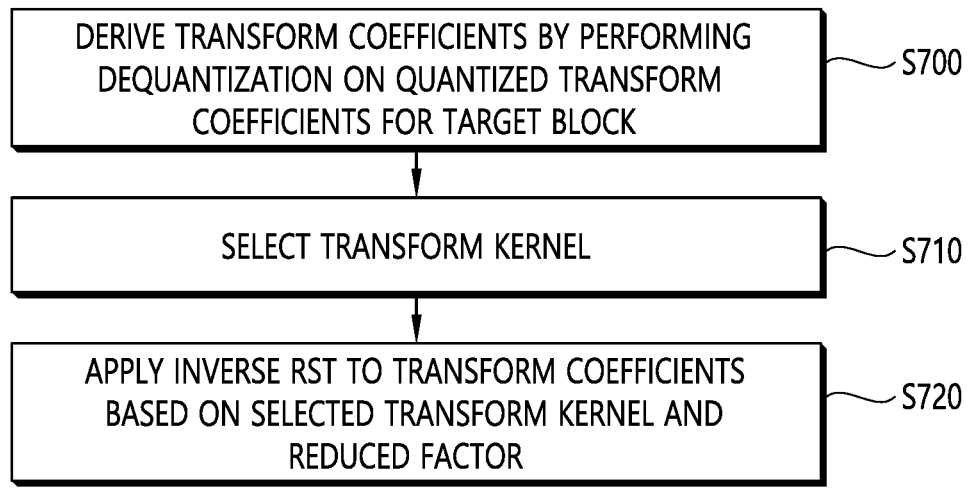
FIG. 7 is a flowchart showing an inverse RST process according to an example of the present disclosure.

FIG. 7 is a flowchart showing an inverse RST process according to an example of the present disclosure.

Each of steps disclosed in FIG. 7 may be performed by the decoding apparatus 300 disclosed in FIG. 3. More specifically, S700 may be performed by the dequantizer 321 disclosed in FIG. 3, and S710 and S720 may be performed by the inverse transformer 322 disclosed in FIG. 3. Therefore, an explanation for the specific content duplicated with contents described above in FIG. 3 will be omitted or made briefly. Meanwhile, in the present disclosure, the RST may be applied to a transform in a forward direction, and the inverse RST may mean a transform applied to an inverse direction.

In an example, the specific operations according to the inverse RST may be different from the specific operations according to the RST only in that their operation orders are opposite to each other, and the specific operations according to the inverse RST may be substantially similar to the specific operations according to the RST. Accordingly, a person skilled in the art will readily understand that the descriptions of S700 to S720 for the inverse RST described below may be applied to the RST in the same or similar manner.

The decoding apparatus 300 according to an example may derive the transform coefficients by performing dequantization on the quantized transform coefficients for the target block (S700).

The decoding apparatus 300 according to an example may select a transform kernel (S710). More specifically, the decoding apparatus 300 may select the transform kernel based on at least one of informations on a transform index, a width and height of a region to which the transform is applied, an intra prediction mode used in image decoding, and a color component of the target block. However, the example is not limited to this, and for example, the transform kernel may be predefined, and separate information for selecting the transform kernel may not be signaled.

In one example, information on the color component of the target block may be indicated through CIdx. If the target block is a luma block, CIdx may indicate 0, and if the target block is a chroma block, for example, a Cb block or a Cr block, then CIdx may indicate a non-zero value (for example, 1).

The decoding apparatus 300 according to an example may apply the inverse RST to transform coefficients based on the selected transform kernel and the reduced factor (S720).

Figure 8:
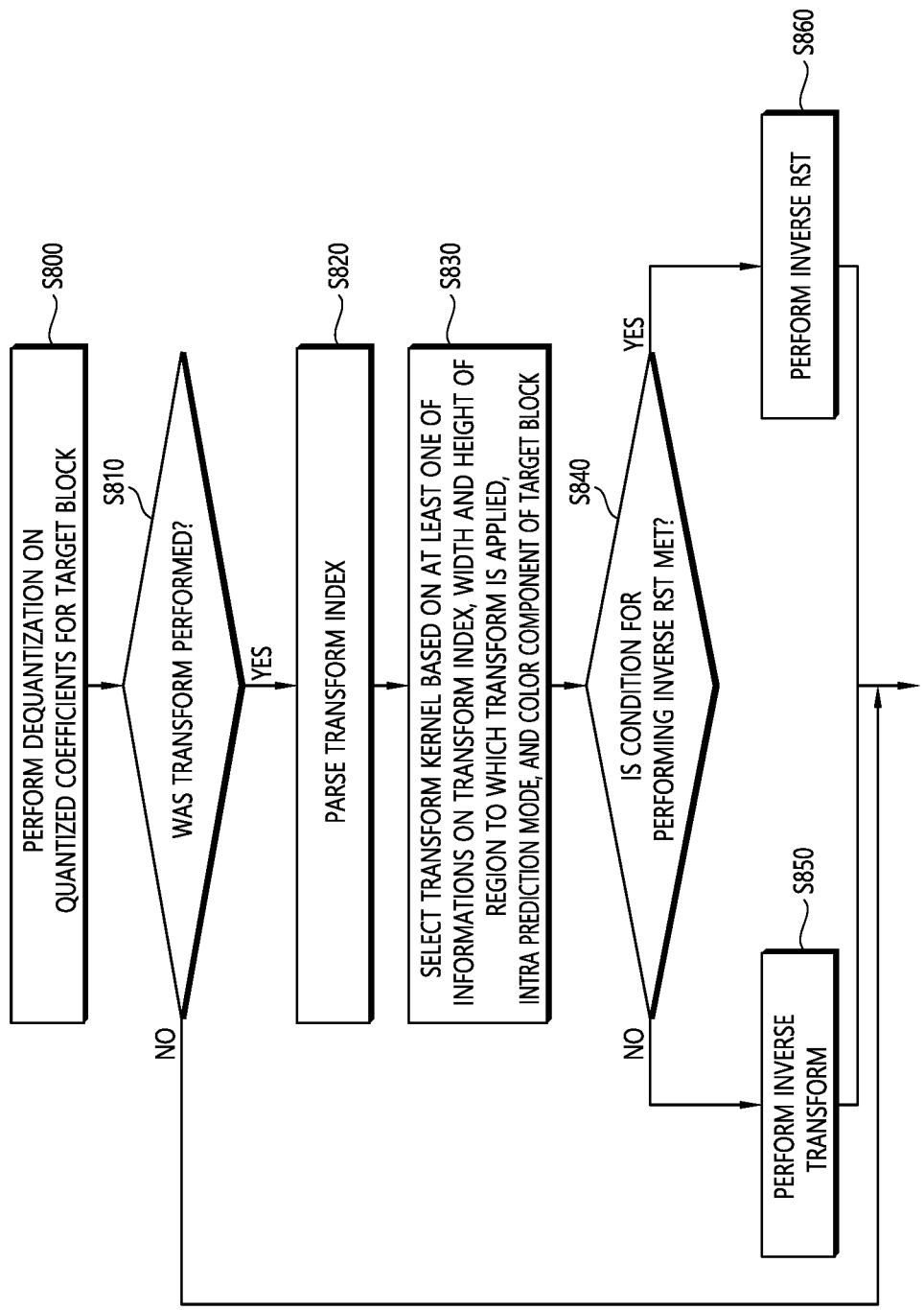
FIG. 8 is a flowchart showing an inverse RST process according to another example of the present disclosure.

FIG. 8 is a flowchart showing an inverse RST according to another example of the present disclosure.

Each of steps disclosed in FIG. 8 may be performed by the decoding apparatus 300 disclosed in FIG. 3. More specifically, S800 may be performed by the dequantizer 321 disclosed in FIG. 3, and S810 and S860 may be performed by the inverse transformer 322 disclosed in FIG. 3. Therefore, an explanation for the specific content duplicated with contents described above in FIG. 3 will be omitted or made briefly.

In an example, as described above, the specific operations according to the inverse RST may be different from the specific operations according to the RST only in that their operation orders are opposite to each other, and the specific operations according to the inverse RST may be substantially similar to the specific operations according to the RST. Accordingly, a person skilled in the art will readily understand that the descriptions of S800 to S860 for the inverse RST described below may be applied to the RST in the same or similar manner.

The decoding apparatus 300 according to an example may perform dequantization on the quantized coefficients for the target block (S800). If the transform has been performed by the encoding apparatus 200, in S800, the decoding apparatus 300 may derive the transform coefficients for the target block by performing dequantization on the quantized transform coefficients for the target block. Conversely, if the transform has not been performed by the encoding apparatus 200, in S800, the decoding apparatus 300 may derive the residual samples for the target block by performing dequantization on the quantized residual samples for the target block.

The decoding apparatus 300 according to an example may determine whether the transform has been performed on the residual samples for the target block in the encoding apparatus 200 (S810), and when it is determined that the transform has been performed, the decoding apparatus may parse the transform index (or decode it from the bitstream) (S820). The transform index may include a horizontal transform index for the transform of the horizontal direction and a vertical transform index for the transform of the vertical direction.

In an example, the transform index may include a primary transform index, a core transform index, an NSST index and the like. The transform index may be expressed as, for example, Transform_idx, and the NSST index may be expressed as, for example, NSST_idx. In addition, the horizontal transform index may be expressed as Transform_idx_h, and the vertical transform index may be expressed as Transform_idx_v.

Meanwhile, according to another example of the present disclosure, the dequantization may be performed after all of the transform indices have been parsed.

The decoding apparatus 300 according to an example may omit the operations according to S820 to S860 when it is determined in S810 that the encoding apparatus 200 has not performed the transform on the residual samples for the target block.

The decoding apparatus 300 according to an example may select the transform kernel based on at least one of informations on the transform index, the width and the height of a region to which the transform is applied, the intra prediction mode used in image decoding, and a color component of the target block (S830).

The decoding apparatus 300 according to an example may determine whether it corresponds to a condition for performing the inverse RST on the transform coefficients for a target block (S840).

In an example, when the width and the height of the region to which the inverse RST is applied are respectively greater than a first coefficient, the decoding apparatus 300 may determine that it corresponds to the condition for performing the inverse RST on the transform coefficients for the target block. The first coefficient may be 4.

In another example, when the multiplication of the width and the height of the region to which the inverse RST is applied is greater than a second coefficient and the smaller one of the width and the height of the region to which the inverse RST is applied is greater than a third coefficient, the decoding apparatus 300 may determine that it corresponds to the condition for performing the inverse RST on the transform coefficients for the target block. The second coefficient and the third coefficient may be preset values.

In still another example, when the width and the height of the region to which the inverse RST is applied are respectively less than or equal to a fourth coefficient, the decoding apparatus 300 may determine that it corresponds to the condition for performing the inverse RST on the transform coefficients for the target block. The fourth coefficient may be 8.

In still another example, when the multiplication of the width and the height of the region to which the inverse RST is applied is less than or equal to a fifth coefficient and the smaller one of the width and the height of the region to which the inverse RST is applied is less than or equal to a sixth coefficient, the decoding apparatus 300 may determine that it corresponds to the condition for performing the inverse RST on the transform coefficients for the target block. The fifth coefficient and the sixth coefficient may be preset values.

In still another example, when at least one of a condition in which the width and the height of the region to which the inverse RST is applied is greater than the first coefficient, a condition in which the multiplication of the width and the height of the region to which the inverse RST is applied is greater than the second coefficient and the smaller one of the width and the height of the region to which the inverse RST is applied is greater than the third coefficient, a condition in which the width and the height of the region to which the inverse RST is applied are less than or equal to the fourth coefficient, and a condition in which the multiplication of the width and the height of the region to which the inverse RST is applied is less than or equal to the fifth coefficient and the smaller one of the width and the height of the region to which the inverse RST is applied is less than or equal to the sixth coefficient is satisfied, the decoding apparatus 300 may determine that it corresponds to the condition for performing the inverse RST on the transform coefficients for the target block.

In the above-described examples, the first to sixth coefficients may be any predefined positive integers. For example, the first to sixth coefficients may be 4, 8, 16, or 32.

The inverse RST according to an example may be applied to a square region included in the target block (that is, when the width and the height of the region to which the inverse RST is applied are the same length), and in some cases, the width and the height of the region to which the inverse RST is applied may be fixed to a value of a predefined coefficient (e.g., 4, 8, 16, 32, etc.). Meanwhile, the region to which the inverse RST is applied is not limited to a square region, but the inverse RST may be applied to a rectangular region or a non-rectangular region. A more detailed description of the region to which the inverse RST is applied will be provided in FIG. 10 below.

In an example, whether or not the condition to perform inverse RST is met may be determined based on the transform index. In other words, the transform index may indicate which transform has been performed on the target block.

The decoding apparatus 300 according to an example may perform the (regular) inverse transform on the transform coefficients for the target block when it is determined in S840 that the condition for performing the inverse RST is not met (S850). As described above in FIG. 4, the (inverse) transform may include, but is not limited to, for example, DCT2, DCT4, DCT5, DCT7, DCT8, DST1, DST4, DST7, NSST, JEM-NSST (HyGT), and the like.

The decoding apparatus 300 according to an example may perform the inverse RST on the transform coefficients for the target block when it is determined in S840 that the condition for performing the inverse RST is determined (S860).

Figure 9:
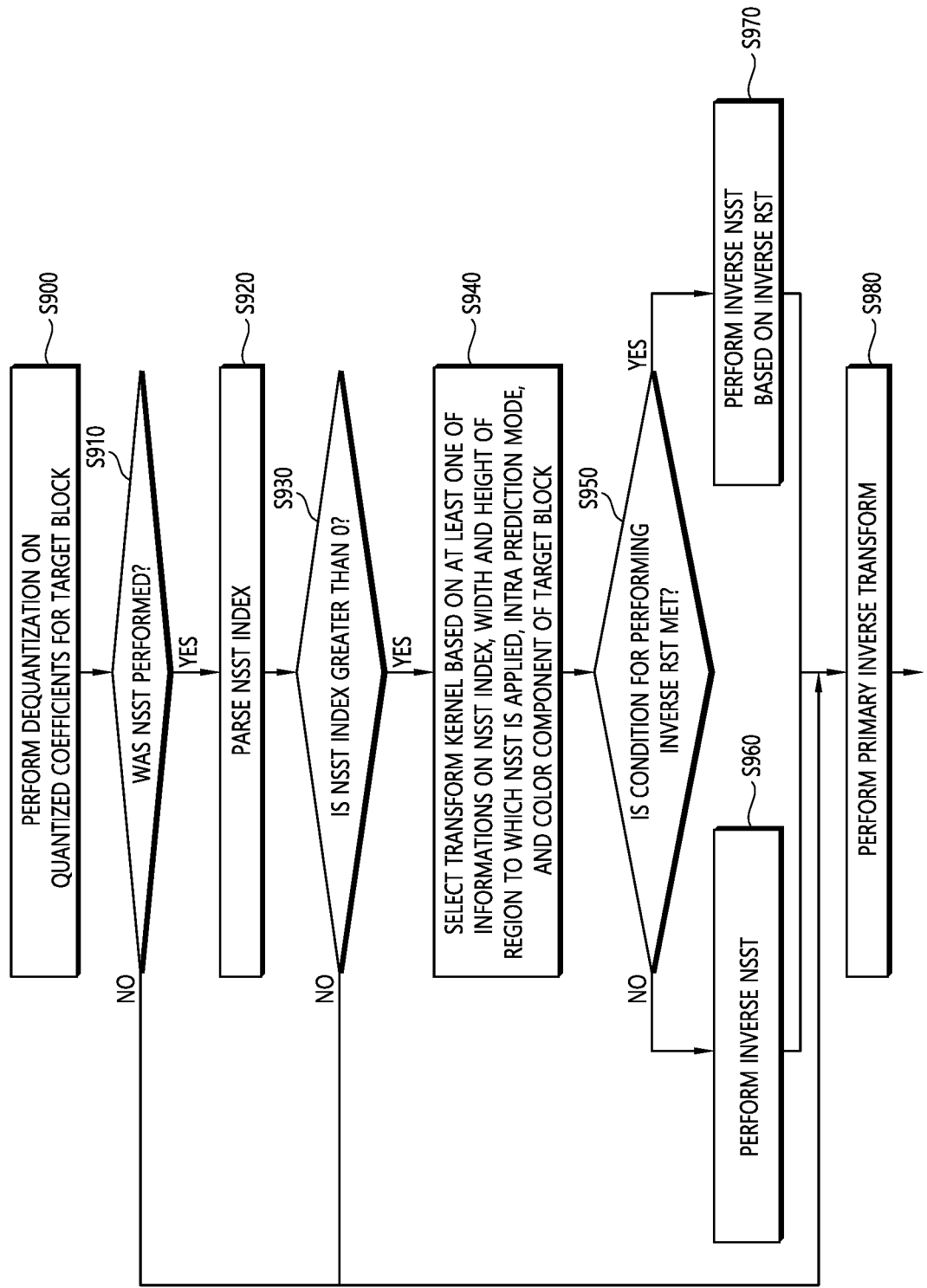
FIG. 9 is a flowchart showing an inverse RST process based on a non-separable secondary transform according to an example of the present disclosure.

FIG. 9 is a flowchart showing an RST process based on a non-separable secondary transform according to an example of the present disclosure.

Each of steps disclosed in FIG. 9 may be performed by the decoding apparatus 300 disclosed in FIG. 3. More specifically, S900 may be performed by the dequantizer 321 disclosed in FIG. 3, and S910 to S980 may be performed by the inverse transformer 322 disclosed in FIG. 3. In addition, S900 of FIG. 9 may correspond to S800 of FIG. 8, S940 of FIG. 9 may correspond to S830 of FIG. 8, and S950 of FIG. 9 may correspond to S840 of FIG. 8. Therefore, an explanation for the specific content duplicated with contents described in FIGS. 3 to 8B above will be omitted or made briefly.

In an example, as described above, the specific operations according to the inverse RST may be different from the specific operations according to the RST only in that their operation orders are opposite to each other, and the specific operations according to the inverse RST may be substantially similar to the specific operations according to the RST. Accordingly, a person skilled in the art will readily understand that the descriptions of S900 to S980 for the inverse RST described below may be applied to the RST in the same or similar manner.

The decoding apparatus 300 according to an example may perform dequantization on the quantized coefficients for the target block (S900).

The decoding apparatus 300 according to an example may determine whether the NSST has been performed on the residual samples for the target block in the encoding apparatus 200 (S910), and when it is determined that the NSST has been performed, the decoding apparatus may parse the NSST index (or decode it from the bitstream) (S920).

The decoding apparatus 300 according to an example may determine whether the NSST index is greater than 0 (S930), and when it is determined that the NSST index is greater than 0, the decoding apparatus may select a transform kernel based on at least one of informations on the NSST index, the width and the height of the region to which the NSST is applied, the intra prediction mode, and the color component of the target block (S940).

The decoding apparatus 300 according to an example may determine whether it corresponds to a condition for performing the inverse RST on the transform coefficients for the target block (S950).

The decoding apparatus 300 according to an example may perform the (regular) inverse NSST, which is not based on the inverse RST, on the transform coefficients for the target block when it is determined in S950 that the condition for performing the inverse RST is not met (S960).

The decoding apparatus 300 according to an example may perform the inverse NSST based on the inverse RST with respect to the transform coefficients for the target block when it is determined in S950 that the condition for performing the inverse RST is met (S970).

The decoding apparatus 300 according to an example may omit the operations according to S920 to S970 when it is determined in S910 that the encoding apparatus 200 has not performed the NSST on the residual samples for the target block.

When it is determined in S930 that the NSST index is not greater than 0, the decoding apparatus 300 according to an example may omit the operations according to S940 to S970.

The decoding apparatus 300 according to an example may perform the inverse primary transform on the modified transform coefficients for the target block derived by applying the inverse NSST (S980). When the inverse primary transform is performed on the modified transform coefficients, the residual samples for the target block may be derived.

Figure 10:
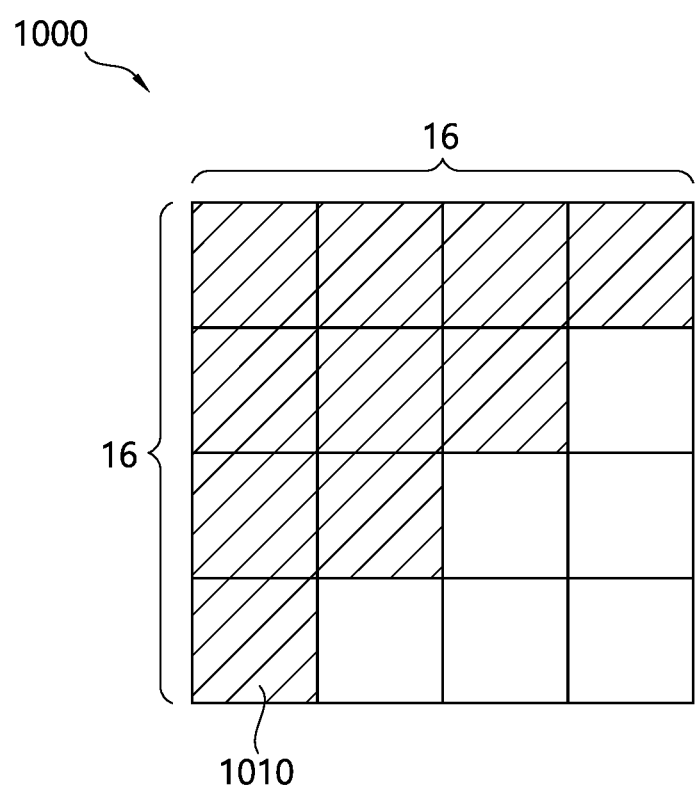
FIG. 10 is a diagram showing a block to which an RST is applied according to an example of the present disclosure.

FIG. 10 is a diagram showing a block to which an RST is applied according to an example of the present disclosure.

As described above with reference to FIG. 8, the region in the target block to which the RST is applied is not limited to a square region, and the RST may also be applied to a rectangular region or a non-rectangular region.

FIG. 10 shows an example in which the RST is applied to a non-rectangular region in the target block 1000 having a size of 16×16. The ten blocks 1010 shaded in FIG. 10 indicate the region in the target block 1000 to which the RST is applied. Since the size of each minimum unit block is 4×4, according to the example of FIG. 10, the RST is applied to ten 4×4 pixels (that is, the RST is applied to 160 pixels). When R=16, the size of the reduced transform matrix may be 16×160.

On the other hand, a person skilled in the art will readily understand that the arrangement of the minimum unit blocks 1010 included in the region to which the RST shown in FIG. 10 is applied is only one of numerous examples. For example, the minimum unit blocks included in the region to which the RST is applied may not be neighboring to each other, and may be in a relationship in which they share only one vertex with each other.

Hereinafter, the design of the RST or inverse RST applicable to the 4×4 block, the arrangement and scan order of transform coefficients generated after applying the 4×4 RST, an index coding method for designating the 4×4 RST to be applied to the transform block, and the like will be described.

More specifically, in the following, a design method of the RST applicable to the 4×4 block according to an example of the present disclosure, a configuration of the region to which the 4×4 RST is applied, a method of arranging the transform coefficients generated after applying the 4×4 RST, a scan order of the arranged transform coefficients, and a method of sorting and adding the transform coefficients generated for each target block are proposed.

Further, as a method of coding an index designating the 4×4 RST applied to the target block according to an example of the present disclosure, a method in which whether a non-zero transform coefficient exists in an unallowed region when the 4×4 RST is applied is determined and the corresponding index is conditionally coded, or a method of omitting the related residual coding for a position that are not allowed after coding the last non-zero transform coefficient position and then conditionally coding the corresponding index is proposed.

In addition, hereinafter, according to an example of the present disclosure, a method of applying different index coding and residual coding to luma and chroma when applying the 4×4 RST is proposed.

Through this, it is possible to significantly reduce the amount of computation when encoding a still image or video, compared to applying other non-separable secondary transforms by applying the 4×4 RST. In addition, based on the fact that, when applying the 4×4 RST, there are no effective transform coefficients in a specific region, the index designating the 4×4 RST can be conditionally coded and the related residual coding can be optimized, which ultimately, can improve coding performance.

According to an example of the present disclosure, a non-separable transform or RST that can be applied to one 4×4 transform block, that is, a 4×4 target block to be transformed is a 16×16 transform. That is, if the data elements constituting the 4×4 target block are arranged in row-first or column-first order, they become a 16×1 vector, and non-separable transform or RST can be applied to the target block. Forward, that is, the forward 16×16 transform that can be performed in the encoding apparatus is constituted with sixteen row direction transform basis vectors, and when an inner product is taken of the 16×1 vector and each transform basis vector, the transform coefficient for the corresponding transform basis vector is obtained. The process of obtaining the corresponding transform coefficients for the sixteen transform basis vectors is the same as multiplying the 16×16 non-separable transform or the RST matrix and the input 16×1 vector. The transform coefficients obtained by matrix multiplication have a 16×1 vector form, and statistical characteristics may be different for each transform coefficient. For example, if the 16×1 transform coefficient vector is constructed with the 0th element to the 15th element, the variance of the 0th element may be greater than the variance of the 15th element. That is, one element located in front of another element may have a greater energy value due to a greater variance value.

Meanwhile, if the inverse 16×16 non-separable transform or inverse RST is applied (when effects of quantization or integerisation calculations are ignored), the original 4×4 target block signal before the transform can be reconstructed from the 16×1 transform coefficient. If the forward 16×16 non-separable transform is an orthonormal transform, the inverse 16×16 transform can be obtained by taking a transpose of the matrix for the forward 16×16 transform. Simply multiplying the inverse 16×16 non-separable transform matrix and the 16×1 transform coefficient vector yields data in the form of a 16×1 vector, and the 4×4 block signal may be reconstructed by arranging it in the row-first or column-first order that was first applied.

Meanwhile, as described above, the elements constituting the 16×1 transform coefficient vector may have different statistical characteristics. As in the previous example, if the transform coefficient located more near the front side (closer to the 0th element) has greater energy, a signal that is very close to the original signal can be reconstructed even though the inverse transform is applied to some of the transform coefficients that appear first without using all the transform coefficients. For example, if the inverse 16×16 non-separable transform is constituted with sixteen column basis vectors, it is possible to reconstruct a 16×1 vector having little error from the original input 16×1 vector data by multiplying a 16×L matrix and a L×1 vector after constructing the 16×L matrix by leaving only L column basis vectors, and leaving only L transform coefficients that are more important among the transform coefficients (L×1 vector, may appear first as in the previous example). As a result, since only L coefficients are involved in the data restoration, obtaining the L×1 transform coefficient vector instead of a 16×1 transform coefficient vector is sufficient even when obtaining a transform coefficient. That is, by selecting L corresponding row direction transform vectors from the forward 16×16 non-separable transform matrix, the L×16 transform matrix is constructed, and then it is multiplied to the 16×1 input vector, so that L significant transform coefficients can be obtained.

At this time, although the L value has a range of $1 \leq L < 16$, and in general, L transform basis vectors may be selected by any method from the sixteen transform basis vectors, it may be advantageous in terms of encoding efficiency to select the transform basis vectors having a high importance in terms of signal energy, as in the example presented above from the perspective of encoding and decoding.

As described above, the 4×4 RST may be applied as the secondary transform, and in this case, it may be applied secondarily to a block to which a primary transform such as DCT-type 2 has been applied. When the size of the block to which the primary transform is applied is assumed to be N×N, in general, the 4×4 RST can be applied when N×N is greater than or equal to 4×4. An example of applying the 4×4 RST to an N×N block is as follows.

1) The 4×4 RST can be applied only to some regions, not all regions of N×N. For example, it can be applied only to the top-left M×M region (M≤N).

2) After dividing a region to which the secondary transform is applied into 4×4 blocks, the 4×4 RST may be applied to each divided block.

3) The above 1) and 2) may be mixed and applied. For example, after dividing the top-left M×M region into 4×4 blocks, the 4×4 RST may be applied to the divided region.

As a specific example, the secondary transform may be applied only to the top-left 8×8 region, and when the N×N block is greater than or equal to 8×8, 8×8 RST may be applied, while, when the N×N block is less than 8×8 (4×4, 8×4, 4×8), it may be divided into 4×4 blocks as in the above 2) and then the 4×4 RST may be applied.

Assuming that L transform coefficients ($1 \leq L < 16$) are generated after applying the 4×4 RST, there is a degree of freedom for how to arrange the L transform coefficients (that is, how to map the transform coefficients into the target block). However, since a predetermined order exist when the transform coefficients are read and processed in the residual coding part, coding performance may vary depending on how the L transform coefficients are arranged in a 2-dimensional block. Residual coding in HEVC starts from the position farthest from the DC position. This is to improve coding performance by using the fact that the quantized coefficient value is 0 or closer to 0 as the distance from the DC position increases. Therefore, for the L transform coefficients, it may be advantageous in terms of coding performance to arrange more important coefficients having high energy to be coded later in the order of residual coding.

FIG. 11 represents three forward scan orders that can be applied to a 4×4 transform coefficient or a transform coefficient block (4×4 block, Coefficient Group (CG)) applied in the HEVC standard. FIG. 11(a) represents a diagonal scan; FIG. 11(b) represents a horizontal scan; and FIG. 11(c) represents a vertical scan.

The residual coding follows the inverse order of the scan order of FIG. 11, that is, the coding is performed in the order of 16 to 1. Since the three scan orders shown in FIG. 11 are selected according to the intra prediction mode, it may be configured such that the scan order for the L transform coefficients is identically determined according to the intra prediction mode.

Figure 12:
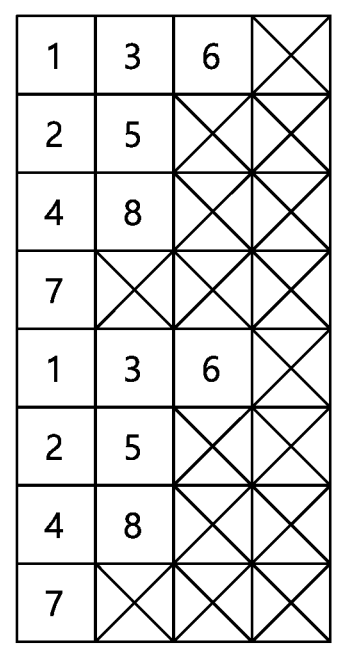
Figure 13:
FIG. 13 is diagrams illustrating the mapping of a transform coefficient based on a diagonal scan order in accordance with another example of the present disclosure.

FIGS. 12 and 13 are diagrams illustrating the mapping of a transform coefficient according to a diagonal scan order in accordance with an example of the present disclosure.

Assuming that the diagonal scan order In FIG. 11 is followed and the top-left 4×8 block is divided into 4×4 blocks and the 4×4 RST is applied to each divided block, the transform coefficients may be located as shown in FIG. 12 when the L value is 8 (that is, if only 8 transform coefficients are left out of 16), and the transform coefficients may be mapped to half the region of each 4×4 block, while positions marked with X may be filled with a value of 0 by default. That is, the secondary transform coefficients resulting from the secondary transform performed based on the RST are mapped into the 4×4 target block based on the forward diagonal scan order.

As described above, the specific operations according to the inverse RST may be different from the specific operations according to the RST only in that their operation orders are opposite to each other, and the specific operations according to the inverse RST may be substantially similar to the specific operations according to the RST. Accordingly, when performing the inverse RST, it is possible to perform an operation with the transform kernel (Equation 8) by reading the secondary transform coefficients mapped in the target block according to the diagonal scan order.

Accordingly, after arranging or mapping the L transform coefficients to each 4×4 block according to the scan order presented in FIG. 11, and mapping 0 to the remaining (16-L) positions of each 4×4 block, the corresponding residual coding (e.g., residual coding in conventional HEVC) may be applied.

Meanwhile, according to another example of the present disclosure, as shown in FIG. 13, the L transform coefficients (a) arranged in two 4×4 blocks may be combined into and mapped to one 4×4 block (b). In particular, when the L value is 8, transform coefficients of two 4×4 blocks are mapped to one 4×4 block, and the one 4×4 target block is completely filled, so no transform coefficients remain in the other 4×4 block. Therefore, since most of the residual codings are unnecessary for the emptied 4×4 block, in the case of HEVC, the corresponding coded_sub_block_flag may be coded as 0. The coded_sub_block_flag applied to HEVC and VVC, which is flag information for indicating the position of a sub-block of a 4×4 array for 16 transform coefficient levels in the current transform block, may be signaled as "0" for the 4×4 block in which no residual remains.

In addition, various methods are possible for mixing the transform coefficients of two 4×4 blocks. In general, they may be combined in any order, but practical examples may include the following methods.

(1) The transform coefficients of the two 4×4 blocks are mixed alternately in the scan order. That is, when the transform coefficients for the upper block in FIG. 12 are $c_0^u$, $c_1^u, c_2^u, c_3^u, c_4^u, c_5^u, c_6^u, c_7^u$, and the transform coefficients of the lower block are $c_0^l, c_1^l, c_2^l, c_3^l, c_4^l, c_5^l, c_6^l, c_7^l$, the coefficients may be mixed alternately as follows: $c_0^u, c_0^l$, $c_1^u, c_1^l, c_2^u, c_2^l, \ldots, c_7^u, c_7^l$. Of course, Of course, the order of $c_\#^u$ and $c_\#^l$ may be changed so that $c_\#^l$ is mapped first.

(2) The transform coefficients for the first 4×4 block may be placed first and then the transform coefficients for the second 4×4 block may be placed. In other words, they may be continuously arranged as follows: $c_0^u, c_1^l, \ldots, c_7^u, c_0^l$, $c_1^l, \ldots, c_7^l$. Of course, the order may be changed as follows: $c_0^l, c_1^l, \ldots, c_7^l, c_0^u, c_1^u, \ldots, c_7^u$.

Hereinafter, a method of coding an NSST index for a 4×4 RST will be described. The first method is a case where the NSST index is coded after the residual coding, and the second method is a case where the NSST index is coded before the residual coding.

Meanwhile, as shown in FIG. 12, when the 4×4 RST is applied, 0 values may be filled from L+1th to 16th according to the transform coefficient scan order for each 4×4 block. Therefore, if a non-zero value occurs among the L+1th to 16th positions in even one of the two 4×4 blocks, it corresponds to the case where the 4×4 RST is not applied.

If the 4×4 RST has a structure that selects and applies one of the prepared transform set such as NSST, it is possible to signal an index (which may be referred to as a transform index, a RST index, or an NSST index) on which transform is to be applied.

Let us assume that if the NSST index is known through the bitstream parsing in the decoding apparatus, this parsing process is performed after the residual coding. If residual coding is performed and it is found that at least one non-zero transform coefficient exists between the L+1th to the 16th, then it is certain that the 4×4 RST is not applied as described above, so it may be set not to parse the NSST index. Therefore, in this case, the NSST index is selectively parsed only when necessary, thus increasing the signaling efficiency.

For example, as in FIG. 12, if the 4×4 RST is applied to several 4×4 blocks within a specific region (all the same 4×4 RSTs may be applied to all or different 4×4 RSTs may be applied), the (same or different) 4×4 RSTs applied to all the 4×4 blocks may be designated through one NSST index. Since the 4×4 RSTs for all the 4×4 blocks and whether to apply or not are determined by one NSST index, it may be configured that the NSST index is not coded when a non-zero transform coefficient exists in an unallowed position (from L+1th to 16th position) even in one 4×4 block by checking during the residual coding process whether there is a non-zero transform coefficient at positions from L+1th to 16th for all the 4×4 blocks.

These NSST indexes may be signaled separately for a luma (Luminance) block and a chroma (Chrominance) block, or in the case of the chroma block, separate NSST indexes may be signaled for Cb and Cr, or one NSST index may be shared by signaling the NSST index only once.

If one NSST index is shared for Cb and Cr, the 4×4 RST indicated by the same NSST index may be applied (the 4×4 RSTs for Cb and Cr may be the same, or separate 4×4 RSTs may be applied even though the NSST index is the same). To apply the above-described conditional signaling for the shared NSST index, it is checked whether there are non-zero transform coefficients from L+1th to 16th for all 4×4 blocks for Cb and Cr, and if any non-zero transform coefficient is found, it may be configured that signaling for the NSST index is omitted.

As another example, also in the case of combining the transform coefficients for two 4×4 blocks as in FIG. 13, after checking whether a non-zero transform coefficient appears at a position where no effective transform coefficient exists when the 4×4 RST is applied, it is possible to determine whether to signal the NSST index. In particular, in a case where the L value is 8 as in FIG. 13 and there are no effective transform coefficients for one 4×4 block when 4×4 RST is applied (the block indicated by Xs in (b) of FIG. 13), it may be set that the NSST index is not signaled if the value is 1 after checking the coded_sub_block_flag of the block without valid transform coefficients.

An optimization method for signaling of an NSST index will be described later in a case where coding for the NSST index is performed before the residual coding according to the second method for coding an NSST index.

If the coding for the NSST index is performed before residual coding, whether or not to apply the 4×4 RST is determined in advance, so residual coding may be omitted for locations where the transform coefficient is sure to be filled with zero.

In this regard, the NSST index value may be signaled so as to make it known whether to apply the 4×4 RST (e.g., if the NSST index is 0, the 4×4 RST is not applied), or it may be signaled through a separate syntax element. For example, if the separate syntax element is the NSST flag, the NSST flag is first parsed to determine whether the 4×4 RST is applied. Then, if the NSST flag value is 1, residual coding may be omitted for positions in which a valid transform coefficient cannot exist.

In the case of HEVC, when performing the residual coding, the last non-zero coefficient position on the TU is first of all coded. If the coding for the NSST index is performed after the last non-zero coefficient position coding, and the location of the last non-zero coefficient is identified as a location where a non-zero coefficient cannot occur assuming the application of 4×4 RST, then the NSST index may not be coded and the 4×4 RST may not be applied. For example, in the case of positions indicated by Xs in FIG. 12, since valid transform coefficients are not located when the 4×4 RST is applied (e.g., a value of 0 may be filled), the coding for the NSST index may be omitted if the last non-zero coefficient is located in the region indicated by X. If the last non-zero coefficient is not located in the region indicated by X, the coding for the NSST index may be performed.

If it is known whether to apply the 4×4 RST by conditionally coding the NSST index after coding for the last non-zero coefficient position (as described above, if the location of the last non-zero coefficient is not allowed when assuming the application of the 4×4 RST, then the coding for the NSST index may be omitted), the remaining residual coding portion after this may be processed in the following two ways.

(1) In the case where the 4×4 RST is not applied, general residual coding may be maintained as it is. That is, the coding is performed under the assumption that the non-zero transform coefficient may exist at any position from the last non-zero coefficient position to the DC position.

(2) In the case of applying the 4×4 RST, for a specific position or a specific 4×4 block (for example, the X position in FIG. 12), the corresponding transform coefficient should not exist (it may be filled with zero by default), so that the residual coding for the corresponding position or block may be omitted. For example, when reaching a position indicated by X in FIG. 12, the coding for sig_coeff_flag (a flag for whether a non-zero coefficient exists at a corresponding position applied to HEVC and VVC) may be omitted, and when the transform coefficients of the two blocks are combined as shown in FIG. 13, the coding for coded_sub_block_flag (exists in HEVC) for the 4×4 block emptied to 0 may be omitted and the corresponding value may be derived as 0, and the 4×4 block may be filled with zero values without separate coding.

On the other hand, in the case of coding the NSST index after the coding for the last non-zero coefficient position, if the x-position (Px) and y-position (Py) of the last non-zero coefficient are less than Tx and Ty (specific threshold), respectively, it may be configured that the NSST index coding is omitted and the 4×4 RST is not applied. For example, when Tx=1 and Ty=1, it means that the NSST index coding is omitted when the last non-zero coefficient exists in the DC position. The method of determining whether to code the NSST index through comparison with the threshold value may be applied differently to luma and chroma. For example, different Tx and Ty may be applied to luma and chroma, or a threshold value may be applied to luma (or chroma) and may not applied to chroma (or luma).

Of course, both methods of omitting the NSST index coding (a method of omitting the NSST index coding when the last non-zero coefficient is located in a region where no valid transform coefficient exists, and a method of omitting the NSST index coding when the X and Y coordinates of the last non-zero coefficient are each smaller than a certain threshold) may be applied. For example, after first performing a threshold check for the last non-zero coefficient position coordinates, it may be checked whether the last non-zero coefficient is located in the region where a valid transform coefficient does not exist, and the inverse order is also possible.

The method of coding the NSST index before the residual coding may be applied to the 8×8 RST. That is, if the last non-zero coefficient is located in a top-left 8×8 region other than the top-left 4×4 region, the coding for the NSST index may be omitted, or otherwise, the coding for the NSST index may be performed. In addition, if the X and Y coordinate values for the last non-zero coefficient position are all less than a certain threshold, the coding for the NSST index may be omitted. Of course, both methods may be applied together.

Meanwhile, when the RST is applied, different NSST index coding and residual coding schemes may be applied for luma and chroma, respectively.

First method in which the NSST index coding is performed after the residual coding (method 1), and a method in which the NSST index coding is performed before the residual coding (method 2) may be applied differently to luma and chroma.

For example, the luma may follow the scheme described in method 2, and method 1 may be applied to the chroma. Alternatively, the NSST index coding may be applied conditionally to the luma according to method 1 or method 2, and the conditional NSST index coding may not be applied to the chroma, and vice versa. That is, the NSST index coding may be applied conditionally to the chroma according to method 1 or method 2, and the conditional NSST index coding may not be applied to the luma.

Hereinafter, an example of the present disclosure will provide a mixed NSST transform set (MNTS) for applying various NSST conditions in the process of applying the NSST or the RST and a method of constituting the MNTS. Hereinafter, according to the size of the transform block to which the NSST is applied, the 16×16 transform applied to the top-left 4×4 region may be expressed as a 4×4 NSST, and the 64×64 transform applied to the top-left 8×8 region may be expressed as an 8×8 NSST.

As described above, in the non-separable transform, according to the size of the lower block selected in advance, only a 4×4 kernel (4×4 NSST) is included in the case of the 4×4 NSST set, and only an 8×8 kernel (8×8 NSST) is included in the case of the 8×8 NSST set. Accordingly, in this example, a method of constituting the MNTS is additionally proposed as follows.

(1) The size of the available NSST kernels may not be fixed, but be varied to one or more depending on the NSST set. (e.g., the 4×4 NSST kernel (4×4 NSST) and the 8×8 NSST kernel (8×8 NSST) may be used together).

(2) The number of available NSST kernels may not be fixed, but be varied depending on the NSST set (e.g., set 1 supports 3 kernels, and set 2 supports 4 kernels).

(3) The order of the NSST kernel may not be fixed, but be defined differently depending on the NSST set (e.g., in set 1, the NSST kernels 1, 2, and 3 are mapped to the NSST indexes 1, 2, and 3, respectively, and in set 2, the NSST kernels 3, 2, and 1 are mapped to the NSST indexes 1, 2, and 3)

A more detailed description of an example of a method of constituting the MNTS is as follows.

As an example, when determining the priority of NSST kernels available in a given set, the size of the NSST kernel (4×4 NSST vs. 8×8 NSST) and the relationship may be considered. For example, if the transform block is large, the 8×8 NSST kernels may be more important than the 4×4 NSST kernels, so lower NSST indexes may be allocated to the 8×8 NSST kernels.

As another example, the priority of NSST kernels available in a given set may be determined under the consideration of the order (1st, 2nd, 3rd) of the NSST kernel. For example, a given 4×4 NSST 1st Kernel may have higher priority tan a 4×4 NSST 2nd Kernel.

Since the NSST_index is encoded and transmitted, it is desirable to give priority to frequently occurring NSST kernel, that is, to encode it with a smaller number of bits to have a low index.

Examples of the MNTS described above may be expressed in Table 3 or Table 4.

TABLE 3

| NSST index | 4 × 4 NSST Set (JEM) | 8 × 8 NSST Set (JEM) | Mixed NSST Set (proposed) |
|---|---|---|---|
| 1 | 4 × 4 $1^{st}$ Kernel | 8 × 8 $1^{st}$ Kernel | 8 × 8 $1^{st}$ Kernel |
| 2 | 4 × 4 $2^{nd}$ Kernel | 8 × 8 $2^{nd}$ Kernel | 8 × 8 $2^{nd}$ Kernel |
| 3 | 4 × 4 $3^{rd}$ Kernel | 8 × 8 $3^{rd}$ Kernel | 4 × 4 $1^{st}$ Kernel |
| ... | ... | ... | ... |

TABLE 4

| NSST index | Mixed NSST Set Type1 | Mixed NSST Set Type2 | Mixed NSST Set Type3 |
|---|---|---|---|
| 1 | 8 × 8 $3^{rd}$ Kernel | 8 × 8 $1^{st}$ Kernel | 4 × 4 $1^{st}$ Kernel |
| 2 | 8 × 8 $2^{nd}$ Kernel | 8 × 8 $2^{nd}$ Kernel | 8 × 8 $1^{st}$ Kernel |
| 3 | 8 × 8 $1^{st}$ Kernel | 4 × 4 $1^{st}$ Kernel | 4 × 4 $2^{nd}$ Kernel |
| 4 | N.A | 4 × 4 $2^{st}$ Kernel | 8 × 8 $2^{nd}$ Kernel |
| 5 | | N.A | 4 × 4 $3^{rd}$ Kernel |
| ... | | | ... |

Hereinafter, according to an example of the present disclosure, a method of determining a secondary NSST set under the consideration of an intra prediction mode and a block size is proposed.

In an example, by constituting a set for the current transform block based on an intra prediction mode in connection with the above-described MNTS, a transform set configured with transform kernels having various sizes may be applied to the transform block.

TABLE 5

| | Intra Mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| Mixed Type | 1 | 1 | 1 | 1 | 1 | 0 | 0 | 0 | 0 | 0 | 0 | 0 | 0 | 0 | 0 | 0 | 1 |
| | Intra Mode | | | | | | | | | | | | | | | | |
| | 17 | 18 | 19 | 20 | 21 | 22 | 23 | 24 | 25 | 26 | 27 | 28 | 29 | 30 | 31 | 32 | 33 |
| Mixed Type | 1 | 1 | 1 | 1 | 0 | 0 | 0 | 0 | 0 | 0 | 0 | 0 | 0 | 0 | 0 | 1 | 1 |
| | Intra Mode | | | | | | | | | | | | | | | | |
| | 34 | 35 | 36 | 37 | 38 | 39 | 40 | 41 | 42 | 43 | 44 | 45 | 46 | 47 | 48 | 49 | 50 |
| Mixed Type | 1 | 1 | 1 | 0 | 0 | 0 | 0 | 0 | 0 | 0 | 0 | 0 | 0 | 0 | 1 | 1 | 1 |

TABLE 5-continued

| | Intra Mode | | | | | | | | | | | | | | | | |
|---|---|---|---|---|---|---|---|---|---|---|---|---|---|---|---|---|---|
| | 51 | 52 | 53 | 54 | 55 | 56 | 57 | 58 | 59 | 60 | 61 | 62 | 63 | 64 | 65 | 66 | 67 |
| Mixed Type | 1 | 1 | 0 | 0 | 0 | 0 | 0 | 0 | 0 | 0 | 0 | 0 | 0 | 0 | 0 | 1 | 0 |

As shown in Table 5, the mixed Type of 0 or 1 is mapped to each intra prediction mode. The mixed type may be defined as an index ('Mixed Type') indicating whether to follow the conventional NSST set construction method or another NSST set construction method for each intra prediction mode.

More specifically, in the case of the intra prediction mode whose mixed type is mapped to '1' in Table 5, the transform set may be constructed according to the MNTS described above without following the conventional (JEM) NSST set construction method.

As still another example, although Table 5 shows as one example two kinds of transform set construction methods (1: conventional NSST set construction, 2: transform set construction based on MNTS) based on mixed type information (flag) associated with intra prediction mode, the proposed MNTS-based set construction method may be one or more kinds, and in this case, the mixed type information may be represented by N (N>2) various values.

As still another example, when constructing the transform set, the intra prediction mode and the size of the corresponding transform block are considered at the same time, and based on this, it may be determined whether to construct as the mixed type or use the conventional NSST set. For example, if the mode type corresponding to the intra prediction mode is 0, the conventional NSST set configuration method may be unconditionally followed, or otherwise (Mode Type==1), various mixed types of NSST sets may be determined according to the size of the corresponding transform block.

Figure 14:
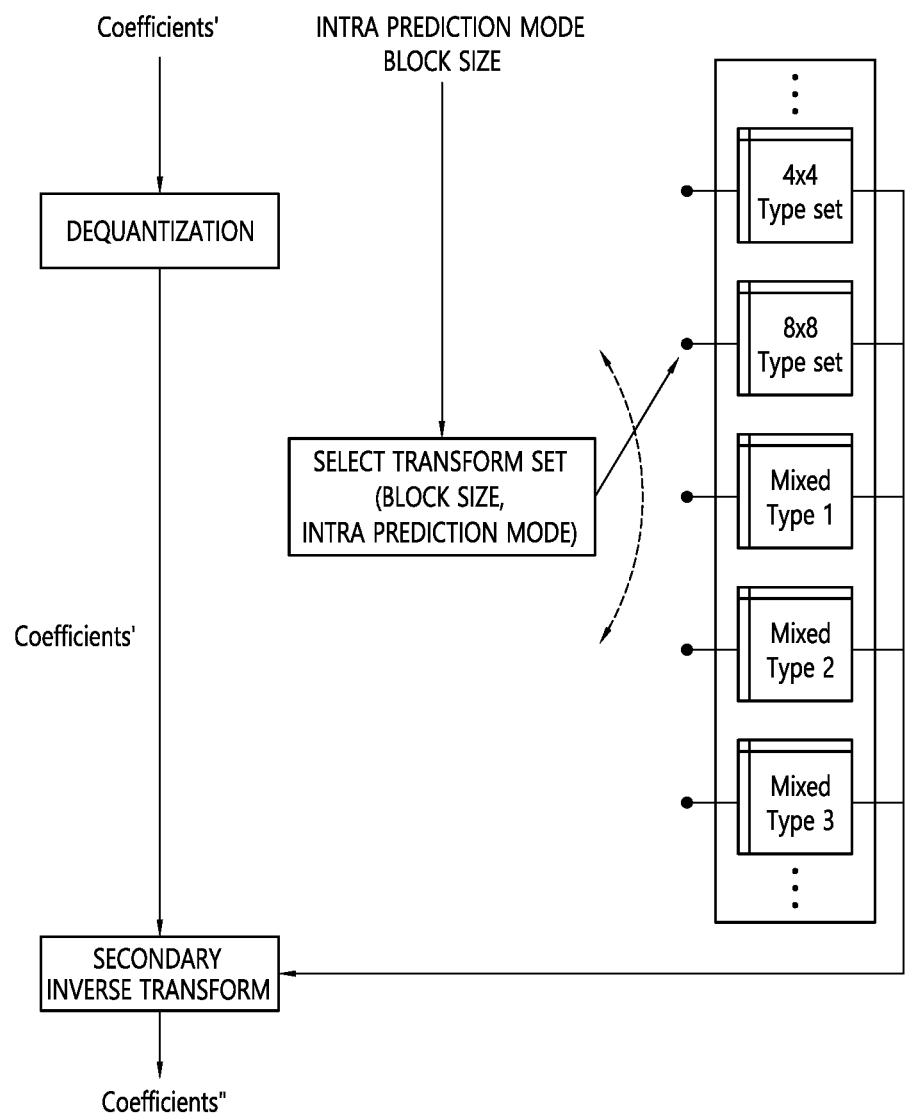
FIG. 14 is a diagram illustrating a method of selecting a transform set under the consideration of a specific condition according to an example of the present disclosure.

FIG. 14 is a diagram illustrating a method of selecting a transform set under the consideration of a specific condition according to an example of the present disclosure.

As shown, when a secondary inverse transform is performed after dequantization of a coefficient is performed, the transform set is selected. At this time, when selecting the transform set, the size of the block and the intra prediction mode may be considered, and whether it is the conventional NSST set or a transform set according to MNTS (a plurality of Mixed Types 1, 2, 3 . . . ) may be considered.

When the transform set is determined in this way, the corresponding NSST kernel may be selected through the NSST index information.

According to another example of the present disclosure, a fixed NSST kernel map as shown in Table 6 below may be used simultaneously to the 4×4 NSST and the 8×8 NSST.

TABLE 6

| | Intra Mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| NSST Set | 0 | 1 | 2 | 2 | 4 | 4 | 6 | 6 | 9 | 9 | 10 | 10 | 12 | 12 | 15 | 15 | 17 |
| | Intra Mode | | | | | | | | | | | | | | | | |
| | 17 | 18 | 19 | 20 | 21 | 22 | 23 | 24 | 25 | 26 | 27 | 28 | 29 | 30 | 31 | 32 | 33 |
| NSST Set | 17 | 18 | 19 | 19 | 21 | 21 | 24 | 24 | 26 | 26 | 27 | 27 | 30 | 30 | 32 | 32 | 34 |
| | Intra Mode | | | | | | | | | | | | | | | | |
| | 34 | 35 | 36 | 37 | 38 | 39 | 40 | 41 | 42 | 43 | 44 | 45 | 46 | 47 | 48 | 49 | 50 |
| NSST Set | 34 | 34 | 32 | 32 | 30 | 30 | 27 | 27 | 26 | 26 | 24 | 24 | 21 | 21 | 19 | 19 | 18 |
| | Intra Mode | | | | | | | | | | | | | | | | |
| | 51 | 52 | 53 | 54 | 55 | 56 | 57 | 58 | 59 | 60 | 61 | 62 | 63 | 64 | 65 | 66 | 67 |
| NSST Set | 17 | 17 | 15 | 15 | 12 | 12 | 10 | 10 | 9 | 9 | 6 | 6 | 4 | 4 | 2 | 2 | N |

That is, the 4×4 non-separable transform (4×4 secondary transform, 4×4 RST, 4×4 inverse RST) and the 8×8 non-separable transform (8×8 secondary transform, 8×8 RST, 8×8 inverse RST) may not use different transform sets, but the same one transform set.

Hereinafter, in a case where the transform set is constructed under the consideration of the intra prediction mode and the size of a block, a method for efficiently encoding a change in the statistical distribution of the encoded and transmitted NSST index values is proposed. To this end, it is a method of selecting a kernel to be substantially applied to the transform block by using the syntax indicating the kernel size proposed above.

In the present example, since the number of available NSST kernels is different for each transform set, a truncated unary binarization method as shown in Table 7 according to the maximum NSST index value available for each set for an efficient binarization method is proposed.

TABLE 7

| NSST Index | Binarization1 (maximum index: 2) | Binarization2 (maximum index: 3) | Binarization3 (maximum index: 4) | Binarization4 (maximum index: 5) | ... |
|---|---|---|---|---|---|
| 0 | 0 | 0 | 0 | 0 | ... |
| 1 | 10 | 10 | 10 | 10 | ... |
| 2 | 11 | 110 | 110 | 110 | ... |
| 3 | N.A | 111 | 1110 | 1110 | ... |
| 4 |  | N.A | 1111 | 11110 | ... |
| 5 |  |  | N.A | 11111 | ... |
| ... |  |  |  | N.A | ... |

Table 7 shows the binarization method of the NSST index value (Truncated Unary), and since the number of available NSST kernels is different for each transform set, the method of binarizing the NSST index was performed according to the maximum NSST index value.

In Table 7, each binary value is context-encoded, and in this case, the context modeling value may be formed under the consideration of variables such as the size of a corresponding transform block, an intra prediction mode, a mixed type value, and a maximum NSST index value of the corresponding transform set.

Meanwhile, according to another example of the present disclosure, unlike Table 2, five or more intra prediction modes may be mapped to one transform set. As described above, the inverse RST is performed based on the transform kernel matrix selected from the transform set including a plurality of transform kernel matrices, and the transform set is determined based on the mapping relationship according to the intra prediction mode applied to the target block. According to the present example, as shown in Tables 8 to 10 below, a plurality of intra prediction modes including the intra prediction mode of the target block may be mapped to one transform set. That is, since the intra prediction mode may be mapped to a transform set for a set of transform matrices, and the number of transform sets is less than the number of intra prediction modes, a plurality of intra prediction modes may be mapped to one transform set.

In other words, when the target block includes a first block and a second block, and the first intra prediction mode applied to the first block and the second intra prediction mode applied to the second block are different from each other, the transform sets mapped to the first intra prediction mode and the second intra prediction mode may be the same.

The number of intra prediction modes mapped to one transform set may be at least one, and five or more intra prediction modes may be mapped to one transform set.

TABLE 8

| | Intra Mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| NSST Set | 0 | 1 | 2 | 2 | 4 | 4 | 6 | 6 | 9 | 9 | 10 | 10 | 12 | 12 | 15 | 15 | 17 |

| | Intra Mode | | | | | | | | | | | | | | | | |
|---|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 | 33 |
| NSST Set | 17 | 18 | 19 | 19 | 21 | 21 | 24 | 24 | 26 | 26 | 27 | 27 | 30 | 30 | 32 | 32 | 34 |

| | Intra Mode | | | | | | | | | | | | | | | | |
|---|---|---|---|---|---|---|---|---|---|---|---|---|---|---|---|---|---|
| | 34 | 35 | 36 | 37 | 38 | 39 | 40 | 41 | 42 | 43 | 44 | 45 | 46 | 47 | 48 | 49 | 50 |
| NSST Set | 34 | 34 | 32 | 32 | 30 | 30 | 27 | 27 | 26 | 26 | 24 | 24 | 21 | 21 | 19 | 19 | 18 |

| | Intra Mode | | | | | | | | | | | | | | | | |
|---|---|---|---|---|---|---|---|---|---|---|---|---|---|---|---|---|---|
| | 51 | 52 | 53 | 54 | 55 | 56 | 57 | 58 | 59 | 60 | 61 | 62 | 63 | 64 | 65 | 66 | 67 |
| NSST Set | 17 | 17 | 15 | 15 | 12 | 12 | 10 | 10 | 9 | 9 | 6 | 6 | 4 | 4 | 2 | 2 | N |

TABLE 9

| | Intra mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| NSST Set | 0 | 1 | 2 | 3 | 2 | 3 | 2 | 3 | 8 | 9 | 8 | 9 | 8 | 9 | 14 | 14 | 14 |

| | Intra mode | | | | | | | | | | | | | | | | |
|---|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 | 33 |
| NSST Set | 17 | 17 | 17 | 20 | 20 | 20 | 23 | 24 | 23 | 24 | 23 | 24 | 29 | 30 | 29 | 30 | 29 |

TABLE 9-continued

| | Intra mode | | | | | | | | | | | | | | | | |
|---|---|---|---|---|---|---|---|---|---|---|---|---|---|---|---|---|---|
| | 34 | 35 | 36 | 37 | 38 | 39 | 40 | 41 | 42 | 43 | 44 | 45 | 46 | 47 | 48 | 49 | 50 |
| NSST Set | 30 | 29 | 30 | 29 | 30 | 29 | 24 | 23 | 24 | 23 | 24 | 23 | 20 | 20 | 20 | 17 | 17 |
| | Intra mode | | | | | | | | | | | | | | | | |
| | 51 | 52 | 53 | 54 | 55 | 56 | 57 | 58 | 59 | 60 | 61 | 62 | 63 | 64 | 65 | 66 | 67 |
| NSST Set | 17 | 14 | 14 | 14 | 9 | 8 | 9 | 8 | 9 | 8 | 3 | 2 | 3 | 2 | 3 | 2 | N |

TABLE 10

| | Intra mode | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| NSST Set | 0 | 1 | 2 | 2 | 2 | 2 | 2 | 10 | 10 | 10 | 10 | 10 | 10 | 10 | 18 | 18 | 18 |
| | Intra mode | | | | | | | | | | | | | | | | |
| | 17 | 18 | 19 | 20 | 21 | 22 | 23 | 24 | 25 | 26 | 27 | 28 | 29 | 30 | 31 | 32 | 33 |
| NSST Set | 18 | 18 | 18 | 18 | 18 | 18 | 18 | 18 | 18 | 18 | 18 | 32 | 32 | 32 | 32 | 32 | 32 |
| | Intra mode | | | | | | | | | | | | | | | | |
| | 34 | 35 | 36 | 37 | 38 | 39 | 40 | 41 | 42 | 43 | 44 | 45 | 46 | 47 | 48 | 49 | 50 |
| NSST Set | 32 | 32 | 32 | 32 | 32 | 32 | 32 | 18 | 18 | 18 | 18 | 18 | 18 | 18 | 18 | 18 | 18 |
| | Intra mode | | | | | | | | | | | | | | | | |
| | 51 | 52 | 53 | 54 | 55 | 56 | 57 | 58 | 59 | 60 | 61 | 62 | 63 | 64 | 65 | 66 | 67 |
| NSST Set | 18 | 18 | 18 | 18 | 10 | 10 | 10 | 10 | 10 | 10 | 10 | 2 | 2 | 2 | 2 | 2 | N |

The NSST Set index used in Tables 8 to 10 may mean any one of 35 transform sets shown in Table 2, and the number of transform sets in Table 8 is 19 out of 35, the number of transform sets in Table 9 is 13 out of 35, and the number of transform sets in Table 10 is 6 out of 35.

This means that, if there is similarity in the direction of prediction, as in adjacent intra prediction modes, the same transform set may be applied, and thus in the case of Table 8, two to three adjacent intra prediction modes are mapped to the same transform set. As an example, in Table 8, the intra prediction modes 33 to 35 of FIG. 5 are mapped to the same transform set.

In the case of Table 9, the intra prediction modes 46 to 48 are mapped to one transform set 20, and the intra prediction modes 29 to 39 are mapped alternatively to the transform sets 29 and 10.

In the case of Table 10 to which the smallest number of transform sets are applied, the intra prediction modes 28 to 40, that is, 13 intra prediction modes are mapped to one transform set 32.

The transform sets of Tables 8 to 10 may be applied only to the 4×4 NSST, or may be applied to both 4×4 NSST and 8×8 NSST. Alternatively, different transform set maps may be applied to each of the 4×4 NSST and the 8×8 NSST (i.e., Tables 8 to 10 are applied differently). For example, the transform set map of Table 2 may be applied to the 4×4 NSST, and the transform set map of Tables 8 to 10 may be applied to the 8×8 NSST.

If the case of applying the 4×4 NSST using Table 2 (using 16×16 direct matrix secondary transform) is referred to as TEST A; the case of applying the 4×4 NSST using Table 2 and the case of applying the 8×8 NSST using Table 2 and the 16×64 direct matrix secondary transform are referred to as TEST B; and the case of applying the 4×4 NSST using Tables 8 to 10 for memory reduction and the case of applying the 8×8 NSST using Tables 8 to 10 and the 16×64 direct matrix secondary transform are referred to as TEST C, then the memory requirements are shown in Table 11.

TABLE 11

| | # Type (35 × 3) |
|---|---|
| HyGT 4 × 4 (BMS) | 105 |
| Test A (4 × 4 NSST) | 105 |
| Test B (4 × 4 NSST + 8 × 8 RST) | 105 |
| Test B with proposed memory reduction Kernel (19 transform sets) | 57 |
| Test B with proposed memory reduction Kernel (13 transform sets) | 39 |

TABLE 11-continued

| | # Type (35 × 3) |
|---|---|
| Test B with proposed memory reduction Kernel (6 transform sets) | 18 |
| Test A with proposed memory reduction Kernel (19 transform sets) | 57 |
| Test A with proposed memory reduction Kernel (13 transform sets) | 39 |
| Test A with proposed memory reduction Kernel (6 transform sets) | 18 |

If each transform set for the planner mode and DC mode is constructed with two transform kernels, the numbers in the "#Type" column of Table 11 should be subtracted by two. For example, "#Type" of "Test B with proposed memory reduction Kernel (6 transform sets)" would be 16. As shown in Table 11, the total number of the transform kernels may be significantly reduced as the number of transform sets to be mapped decreases. Therefore, it is possible to reduce the memory requirements through a reasonable trade-off between performance and complexity. In Table 11, for HyGT 4×4 (BMS), Test A (4×4 NSST) and Test B (4×4 NSST+8×8 RST), the transform set map of Table 2 may be used.

Figure 15:
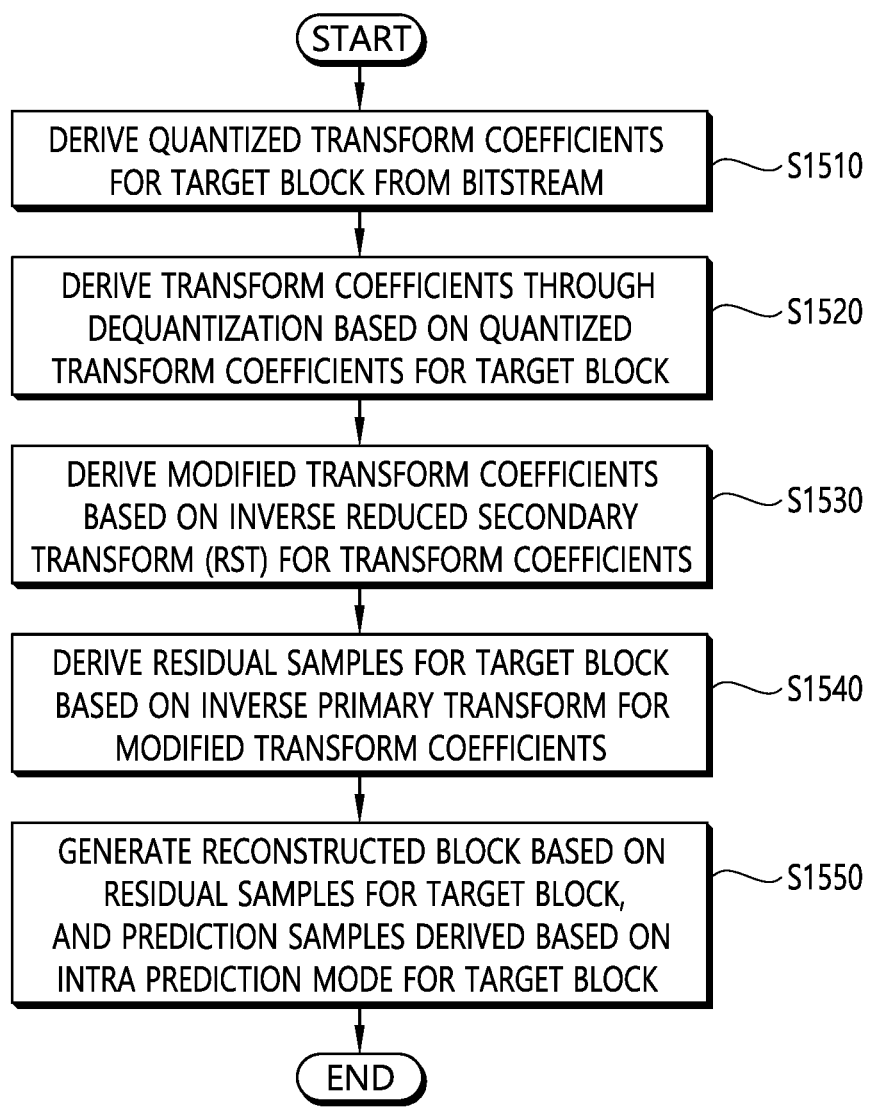
FIG. 15 is a flowchart showing operation of a video decoding apparatus according to an example of the present disclosure.

FIG. 15 is a flowchart showing operation of a video decoding apparatus according to an example of the present disclosure.

Each of steps disclosed in FIG. 15 may be performed by the decoding apparatus 300 disclosed in FIG. 3. More specifically, S1510 may be performed by the entropy decoder 310 disclosed in FIG. 3; S1520, by the dequantizer 321 disclosed in FIG. 3; S1530 and S1540, by the inverse transformer 322 disclosed in FIG. 3; and S1550, by the adder 340 disclosed in FIG. 3. Furthermore, operations according to S1510 to S1550 are based on some of contents described in FIGS. 6 to 10 above. Therefore, an explanation for the specific content duplicated with contents described in FIGS. 3, and 6 to 10 above will be omitted or made briefly.

The decoding apparatus 300 according to an example may derive quantized transform coefficients for a target block from a bitstream (S1510). More specifically, the decoding apparatus 300 may decode information on quantized transform coefficients for the target block from the bitstream, and may derive the quantized transform coefficients for the target block based on the information on the quantized transform coefficients for the target block. The information on the quantized transform coefficients for the target block may be included in a sequence parameter set (SPS) or a slice header, and may include at least one of information on whether or not the reduced transform (RST) is applied, information on the reduced factor, information on a minimum transform size to which the reduced transform is applied, information on a maximum transform size to which the reduced transform is applied, and information on a reduced inverse transform size.

More specifically, the information on whether or not the reduced transform is applied may be represented through an available flag; the information on the reduced factor may be represented through the reduced factor value; the information on the minimum transform size to which the reduced inverse transform is applied (that is, the minimum transform kernel size allowed when performing the inverse transform) may be represented through the minimum transform size value; the information on the maximum transform size to which the reduced inverse transform is applied (that is, the maximum transform kernel size applied when performing the inverse transform) may be represented through the maximum transform size value; and the information on the size of the reduced inverse transform (that is, the size of the transform kernel) substantially applied to the inverse transform may be represented through the size value of the reduced inverse transform. At this time, the available flag may be signaled through a first syntax element; the reduced factor value may be signaled through a second syntax element; the minimum transform size value may be signaled through a third syntax element; the maximum transform size value may be signaled through the fourth syntax element; and the reduced inverse transform size value may be signaled through the fifth syntax element.

In an example, the first syntax element may be represented by the syntax element Reduced_transform_enabled_flag. When the reduced transform is applied, the syntax element Reduced_transform_enabled_flag indicates 1, and when the simplified transform is not applied, the syntax element Reduced_transform_enabled_flag may indicate 0. When the syntax element Reduced_transform_enabled_flag is not signaled, the value of the syntax element Reduced_transform_enabled_flag may be estimated to be 0.

In addition, the second syntax element may be expressed as a syntax element Reduced_transform_factor. The syntax element Reduced_transform_factor may indicate the value of R/N, where N may mean the square of the length of one side of the block to which the transform is applied, or the total number of transform coefficients in the block to which the transform is applied. R may mean a reduced coefficient less than N. However, examples are not limited to this, and, for example, Reduced_transform_factor may indicate R instead of R/N. When considered from the viewpoint of the reduced inverse transform matrix, R means the number of columns of the reduced inverse transform matrix, and N means the number of rows of the reduced inverse transform matrix. In this case, the number of columns of the reduced inverse transform matrix should be less than the number of rows. R may be, for example, a value of 8, 16, or 32, but is not limited to this. When the syntax element Reduced_transform_factor is not signaled, the value of Reduced_transform_factor may be estimated as R/N (or R).

Also, the third syntax element may be expressed as a syntax element min_reduced_transform_size. When the syntax element min_reduced_transform_size is not signaled, the value of min_reduced_transform_size may be estimated as 0.

In addition, the fourth syntax element may be expressed as a syntax element max_reduced_transform_size. When the syntax element max_reduced_transform_size is not signaled, the value of max_reduced_transform_size may be estimated as 0.

In addition, the fifth syntax element may be expressed as a syntax element reduced_transform_size. The size value of the reduced inverse transform, which is signaled while being included in the syntax element reduced_transform_size, may represent the size of the reduced transform matrix, that is, the transform kernel, that is, the size of reduced transform matrix shown in Equation 4 or Equation 5, and the number of dimensions reduced for the reduced transform may be represented, but it is not limited this. When the syntax element reduced_transform_size is not signaled, the value of reduced_transform_size may be estimated as 0.

An example in which information on quantized transform coefficients for a target block is signaled being included in the SPS is shown in Table 12 below.

TABLE 12

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( sps_max_sub_layers_minus1 ) | |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
| ... | |
| Reduced_transform_enabled_flag | u(1) |
| if(reduced_transform_enabled_flag) { | |
|   reduced_transform_factor | ue(v) |
|   min_reduced_transform_size | ue(v) |
|   max_reduced_transform_size | ue(v) |
|   reduced_transform_size | ue(v) |
| } | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

The decoding apparatus 300 according to an example may derive the transform coefficients by performing dequantization on the quantized transform coefficients for the target block (S1520).

The decoding apparatus 300 according to an example may derive modified transform coefficients based on an inverse reduced secondary transform (RST) of the transform coefficients (S1530).

In an example, the reduced inverse transform may be performed based on the reduced inverse transform matrix, and the reduced inverse transform matrix may be a non-square matrix in which the number of columns is less than the number of rows.

In an example, S1530 may include decoding a transform index, determining whether a condition for applying the reduced inverse transform is met based on the transform index, selecting a transform kernel, and applying the reduced inverse transform to the transform coefficients based on the selected transform kernel and the reduced factor when the condition for applying the reduced inverse transform is met. In this case, the size of the reduced inverse transform matrix may be determined based on the simplification factor.

If the reduced inverse transform according to S1530 is based on the inverse NSST, the modified transform coefficients for the target block may be derived by performing the reduced inverse transform on the transform coefficients for the target block.

The decoding apparatus 300 according to an example may derive the residual samples for the target block based on the inverse transform for the modified transform coefficients (S1540).

The decoding apparatus 300 may perform the inverse primary transform on the modified transform coefficients for the target block. In this case, the reduced inverse transform may be applied as the inverse primary transform, or the conventional separable transform may be used.

The decoding apparatus 300 according to an example may generate the reconstructed samples based on residual samples for the target block and prediction samples for the target block (S1550).

Referring to S1530, it may be confirmed that the residual samples for the target block are derived based on the reduced inverse transform of the transform coefficients for the target block. When considered from the viewpoint of the size of the inverse transform matrix, the size of the regular inverse transform matrix is N×N, but the size of the reduced inverse transform matrix is reduced to N×R, so memory usage in a case of performing the reduced transform can be reduced by an R/N ratio when compared with a case of performing the regular transform. In addition, when compared to the number of multiplication calculations N×N in a case of using the regular inverse transform matrix, the use of the reduced inverse transform matrix can reduce the number of multiplication calculations by the R/N ratio (N×R). In addition, when applying the reduced inverse transform, only R transform coefficients need to be decoded, and thus, compared with decoding N transform coefficients when the conventional inverse transform is applied, the total number of transform coefficients for the target block may decrease from N to R, thereby increasing decoding efficiency. In summary, according to S1530, the (inverse) transform efficiency and decoding efficiency of the decoding apparatus 300 may be increased through the reduced inverse transform.

Figure 16:
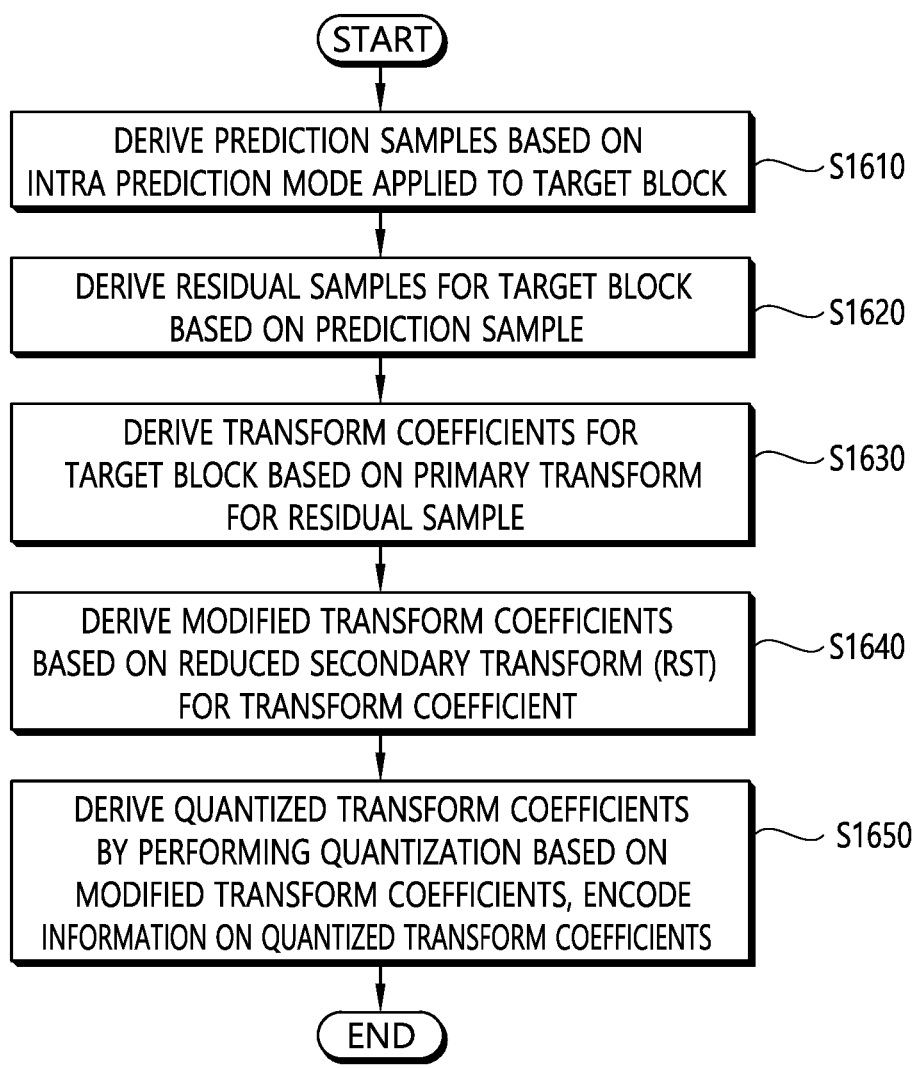
FIG. 16 is a flowchart showing operation of a video encoding apparatus according to an example of the present disclosure.

FIG. 16 is a flowchart showing operation of a video encoding apparatus according to an example of the present disclosure.

Each step disclosed in FIG. 16 may be performed by the encoding apparatus 200 disclosed in FIG. 2. More specifically, S1610 may be performed by the predictor 220 disclosed in FIG. 2; S1620 may be performed by the subtractor 231 disclosed in FIG. 2; S1630 and S1640 may be performed by the transformer 232 disclosed in FIG. 2; and S1650 may be performed by the quantizer 233 and entropy encoder 240 disclosed in FIG. 2. Furthermore, operations according to S1610 to S1650 are based on some of contents described in FIGS. 6 to 10 above. Therefore, an explanation for the specific content duplicated with contents described in FIGS. 2, and 6 to 10 above will be omitted or made briefly.

The encoding apparatus 200 according to an embodiment may derive the prediction samples based on the intra prediction mode applied to the target block (S1610).

The encoding apparatus 200 according to an example may derive the residual samples for the target block (S1620).

The encoding apparatus 200 according to an example may derive the transform coefficients for the target block based on primary transform for the residual sample (S1630). The primary transform may be performed through a plurality of transform kernels, and in this case, the transform kernel may be selected based on the intra prediction mode.

The decoding apparatus 300 may perform the NSST on the transform coefficients for the target block, and in this case, the NSST may be performed based on the reduced transform or without being based on the reduced transform. If the NSST is performed based on the reduced transform, it may correspond to the operation according to S1640.

The encoding apparatus 200 according to an example may derive the modified transform coefficients for the target block based on the reduced transform (RST) for the transform coefficient (S1640). In an example, the reduced transform may be performed based on the reduced transform matrix, and the reduced transform matrix may be a non-square matrix in which the number of rows is less than the number of columns.

In an example, S1640 may include determining whether a condition for applying the reduced transform is met, generating and encoding the transform index based on the determination, selecting the transform kernel, and applying the reduced transform to the residual samples based on the selected transform kernel and the reduced factor when the condition for applying the reduced transform is met. In this case, the size of the reduced transform matrix may be determined based on the reduced factor.

The encoding apparatus 200 according to an example may derive the quantized transform coefficients by performing quantization based on the modified transform coefficients for the target block, and encode information on the quantized transform coefficients (S1660).

More specifically, the encoding apparatus 200 may generate information on the quantized transform coefficients, and encode information on the generated quantized transform coefficients. The information on the quantized transform coefficients may include the residual information.

In an example, the information on the quantized transform coefficients may include at least one of information on whether or not the reduced transform is applied, information on the reduced factor, information on the minimum transform size to which the reduced transform is applied, and information on a maximum transform size to which the reduced transform is applied.

Referring to S1640, it may be confirmed that the transform coefficients for the target block are derived based on the reduced transform for the residual samples. When considered from the viewpoint of the size of the transform matrix, the size of the regular transform matrix is N×N, but the size of the reduced transform matrix is reduced to R×N, so memory usage in a case of performing the reduced transform can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N). In addition, when applying the reduced transform, only R transform coefficients need to be derived, and thus, compared with N transform coefficients being derived when the conventional transform is applied, the total number of transform coefficients for the target block may decrease from N to R, thereby decreasing the amount of data transmitted by the encoding apparatus 200 to the decoding apparatus 300. In summary, according to S1640, the transform efficiency and coding efficiency of the encoding apparatus 200 may be increased through the reduced transform.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 17:
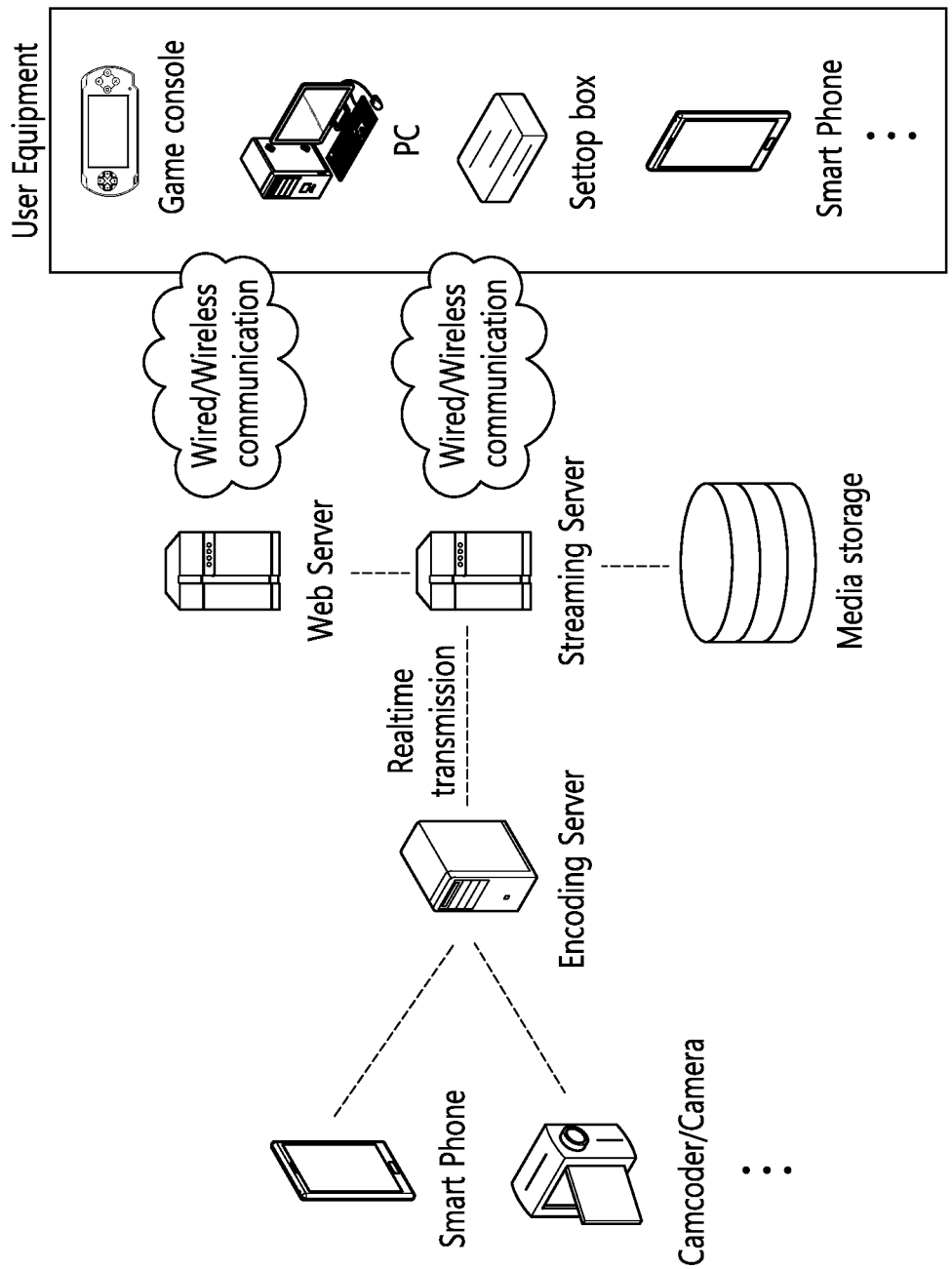
FIG. 17 illustratively represents a content streaming system structure diagram to which the present disclosure is applied.

FIG. 17 illustratively represents a content streaming system structure diagram to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

What is claimed is:

1. An image decoding method performed by a decoding apparatus, comprising:
   deriving quantized transform coefficients for a target block from a bitstream;
   deriving dequantized transform coefficients for the target block through dequantization based on the quantized transform coefficients for the target block;
   deriving modified transform coefficients based on an inverse reduced secondary transform (RST) for the dequantized transform coefficients, wherein the inverse RST derives the modified transform coefficients through a matrix operation of the dequantized transform coefficients and a transform kernel matrix, a number of the modified transform coefficients is greater than a number of the dequantized transform coefficients, the modified transform coefficients are arranged in a top-left area of the target block, and the top-left area is a top-left 4×4 area of the target block or a top-left 8×8 area of the target block;
   deriving residual samples for the target block based on an inverse primary transform for the modified transform coefficients; and
   generating a reconstructed picture based on the residual samples for the target block and prediction samples derived based on an intra prediction mode for the target block,
   wherein the inverse RST is performed based on the transform kernel matrix selected from a transform set including a plurality of transform kernel matrices,
   wherein the transform set is determined based on a mapping relationship according to the intra prediction mode applied to the target block, and
   wherein five or more directional intra prediction modes are mapped to one transform set.

2. The image decoding method of claim 1, wherein:
   a first intra prediction mode for a first target block to which the inverse RST is applied and a second intra prediction mode for a second target block to which the inverse RST is applied are different from each other, and
   transform sets mapped to the first intra prediction mode and the second intra prediction mode are same.

3. The image decoding method of claim 1, wherein the modified transform coefficients are mapped into the target block based on a diagonal scan order.

4. The image decoding method of claim 1, further comprising:
   obtaining information on whether the inverse RST is applied, wherein the information is included in a sequence parameter set (SPS) in the bitstream.

5. An image encoding method performed by an image encoding apparatus, comprising:
   deriving prediction samples based on an intra prediction mode applied to a target block;
   deriving residual samples for the target block based on the prediction samples;
   deriving transform coefficients for the target block based on a primary transform for the residual samples;
   deriving modified transform coefficients based on a reduced secondary transform (RST) for the transform coefficients; and
   deriving quantized transform coefficients by performing quantization based on the modified transform coefficients,
   wherein the RST derives the modified transform coefficients through a matrix operation of the transform coefficients and a transform kernel matrix,
   a number of the modified transform coefficients is less than a number of the transform coefficients, and
   the transform coefficients are arranged in a top-left area of the target block,
   wherein the top-left area is a top-left 4×4 area of the target block or a top-left 8×8 area of the target block,
   wherein the RST is performed based on the transform kernel matrix selected from a transform set including a plurality of transform kernel matrices,
   wherein the transform set is determined based on a mapping relationship according to the intra prediction mode applied to the target block, and
   wherein five or more directional intra prediction modes are mapped to one transform set.

6. The image encoding method of claim 5, wherein:
   a first intra prediction mode for a first target block to which the RST is applied and a second intra prediction mode for a second target block to which the RST is applied are different from each other, and
   transform sets mapped to the first intra prediction mode and the second intra prediction mode are same.

7. The image encoding method of claim 5, further comprising:
encoding information on whether the RST is applied, wherein the information is included in a sequence parameter set (SPS) in a bitstream.

8. A transmitting method of data for an image, comprising:
obtaining a bitstream for the image, wherein the bitstream is generated based on deriving prediction samples based on an intra prediction mode applied to a target block, deriving residual samples for the target block based on the prediction samples, deriving transform coefficients for the target block based on a primary transform for the residual samples, deriving modified transform coefficients based on a reduced secondary transform (RST) for the transform coefficients deriving quantized transform coefficients by performing quantization based on the modified transform coefficients, and encoding image information related to the quantized transform coefficients; and
transmitting the data comprising the bitstream, wherein the RST derives the modified transform coefficients through a matrix operation of the transform coefficients and a transform kernel matrix, a number of the modified transform coefficients is less than a number of the transform coefficients, and the transform coefficients are arranged in a top-left area of the target block, wherein the top-left area is a top-left 4×4 area of the target block or a top-left 8×8 area of the target block, wherein the RST is performed based on the transform kernel matrix selected from a transform set including a plurality of transform kernel matrices, wherein the transform set is determined based on a mapping relationship according to the intra prediction mode applied to the target block, and wherein five or more directional intra prediction modes are mapped to one transform set.

* * * * *